United States Patent
Imoto et al.

(10) Patent No.: US 9,323,343 B2
(45) Date of Patent: Apr. 26, 2016

(54) INFORMATION PROCESSING METHOD AND INFORMATION PROCESSING APPARATUS

(71) Applicant: Panasonic Intellectual Property Corporation of America, Torrance, CA (US)

(72) Inventors: Hiroyasu Imoto, Osaka (JP); Masaki Yamauchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/386,996

(22) PCT Filed: Jan. 23, 2014

(86) PCT No.: PCT/JP2014/000334
§ 371 (c)(1),
(2) Date: Sep. 22, 2014

(87) PCT Pub. No.: WO2014/119258
PCT Pub. Date: Aug. 7, 2014

(65) Prior Publication Data
US 2015/0054742 A1  Feb. 26, 2015

(30) Foreign Application Priority Data
Jan. 31, 2013 (JP) ................................. 2013-017761

(51) Int. Cl.
*G06F 3/041* (2006.01)
*G06F 3/01* (2006.01)
(Continued)

(52) U.S. Cl.
CPC ............... *G06F 3/017* (2013.01); *G06F 3/038* (2013.01); *G06F 3/0481* (2013.01); *G06F 3/0484* (2013.01)

(58) Field of Classification Search
CPC ....... G06F 3/011; G06F 3/017; G06F 3/0481; G06F 3/0484; G06F 9/00; H04N 7/147
See application file for complete search history.

(56) References Cited

U.S. PATENT DOCUMENTS

| 6,147,678 | A | 11/2000 | Kumar et al. |
| 7,138,983 | B2 * | 11/2006 | Wakai ............. G06F 3/017 178/18.01 |

(Continued)

FOREIGN PATENT DOCUMENTS

| JP | 2002-182892 | 6/2002 |
| JP | 2008-52590 | 3/2008 |

(Continued)

OTHER PUBLICATIONS

International Search Report issued Apr. 15, 2014 in International Application No. PCT/JP2014/000334.

(Continued)

*Primary Examiner* — Joe H Cheng
(74) *Attorney, Agent, or Firm* — Wenderoth, Lind & Ponack, L.L.P.

(57) ABSTRACT

An information processing method is performed by an information processing apparatus, for executing predetermined processing in relation to an object displayed on a screen. The information processing method includes: obtaining position information indicating positions detected for two or more parts of an operating body; calculating a control amount on a basis of the positions of the two or more parts, the positions being indicated in the position information; and controlling including displaying, on the screen, a control symbol including a first symbol which represents the control amount calculated in the calculating and a second symbol which represents a threshold to be a criterion for determining whether or not the control amount satisfies a predetermined condition, and executing the predetermined processing in a case where the control amount is determined to satisfy the predetermined condition.

14 Claims, 10 Drawing Sheets

(51) Int. Cl.
  *G06F 3/0484*  (2013.01)
  *G06F 3/038*   (2013.01)
  *G06F 3/0481*  (2013.01)

(56) References Cited

U.S. PATENT DOCUMENTS

| | | | |
|---|---|---|---|
| 7,844,921 B2 | 11/2010 | Ike et al. | |
| 8,325,214 B2 | 12/2012 | Hildreth | |
| 8,970,518 B2* | 3/2015 | Ujiie | G06F 3/03547 345/173 |
| 8,970,528 B2* | 3/2015 | Kojima | G06F 3/03547 345/173 |
| 2006/0025218 A1* | 2/2006 | Hotta | A63F 13/06 463/37 |
| 2006/0026521 A1* | 2/2006 | Hotelling | G06F 3/0418 715/702 |
| 2006/0238520 A1* | 10/2006 | Westerman | G06F 3/0235 345/173 |
| 2008/0005703 A1 | 1/2008 | Radivojevic et al. | |
| 2008/0036743 A1* | 2/2008 | Westerman | G06F 3/038 345/173 |
| 2008/0052643 A1 | 2/2008 | Ike et al. | |
| 2008/0259040 A1* | 10/2008 | Ording | G06F 3/0488 345/173 |
| 2009/0006991 A1* | 1/2009 | Lindberg | G06F 3/04817 715/763 |
| 2009/0079813 A1 | 3/2009 | Hildreth | |
| 2009/0201261 A1* | 8/2009 | Day | G06F 3/04883 345/173 |
| 2010/0253619 A1* | 10/2010 | Ahn | G06F 3/012 345/157 |
| 2010/0315336 A1* | 12/2010 | Butler | G06F 3/017 345/158 |
| 2011/0083112 A1 | 4/2011 | Matsubara et al. | |
| 2011/0163968 A1* | 7/2011 | Hogan | G06F 3/04883 345/173 |
| 2011/0164029 A1* | 7/2011 | King | G06F 3/04883 345/419 |
| 2012/0229406 A1* | 9/2012 | Wu | G06F 3/04886 345/173 |
| 2012/0306769 A1* | 12/2012 | Zhu | G06F 3/04883 345/173 |
| 2013/0002551 A1* | 1/2013 | Imoto | G06F 3/013 345/158 |
| 2013/0016954 A1* | 1/2013 | Watanabe | G11B 27/031 386/230 |
| 2013/0027503 A1 | 1/2013 | Hildreth | |
| 2013/0029731 A1* | 1/2013 | Fuchigami | H04M 1/72583 455/566 |
| 2013/0181897 A1 | 7/2013 | Izumi | |

FOREIGN PATENT DOCUMENTS

| | | |
|---|---|---|
| JP | 2009-151424 | 7/2009 |
| JP | 2010-541398 | 12/2010 |
| JP | 2011-81469 | 4/2011 |
| JP | 2012-68854 | 4/2012 |
| WO | 2009/042579 | 4/2009 |

* cited by examiner

INFORMATION PROCESSING METHOD AND INFORMATION PROCESSING APPARATUS

TECHNICAL FIELD

The present invention relates to an information processing method and an information processing apparatus which provides a Graphical User Interface (GUI). In particular, the present invention relates to a technique to execute an update of screen display and the like, based on a position of an operating body in the three-dimensional (3D) space.

BACKGROUND ART

Recent improvement in computer technology and implementation of sophisticated information terminals have prompted development of input apparatuses which allow users to input information, such as instructions, through motions of their hands and fingers and changes in their postures, without holding apparatuses such as remote controllers and wearing special apparatuses.

Such input apparatuses allow the users to move pointers through movements of their hands and fingers to point to any given object displayed on the screens. These input apparatuses, however, lack a mechanism for reliable operations, such as switches for a remote control and a mouse, and have difficulties in identifying a user's intentional actions including selection and determination of an object.

Hence, as a technique which enables the selection of an object, Patent Literature 1 (PTL 1) discloses a technique to monitor the motion of a pointer indicating an object on a screen, and to determine that the user performs a selection action when the movement locus of the pointer matches a predetermined pattern.

Furthermore, Patent Literature 2 (PTL 2) discloses an interface apparatus which determines that a user performs a selection action when the user makes a predetermined hand and finger gesture which is different from a hand and finger gesture to be made when the user points to the object. In addition, the interface apparatus disclosed in PTL 2 displays, on the screen, views of hand and finger gestures to be used for operations, and determination results of the hand and finger gestures. Hence the user can perform an operation, checking the screen without remembering a predetermined hand and finger gesture.

Moreover, Patent Literature 3 (PTL 3) discloses an information. processing apparatus which displays, on a screen providing an object, an obtained image of a user captured by a camera and a guiding frame for detecting a predetermined pose of the user. Specifically, the information displaying apparatus displays a part of a hand of the user in the obtained image (i) in a red frame when the part is placed within the guiding frame and (ii) in a blue frame when the part is placed outside the guiding frame. This encourages the user to move the part of the hand in the blue frame into the guiding frame, and makes it possible to execute processing corresponding to the guiding frame.

CITATION LIST

Patent Literature

[PTL 1]
   Japanese Unexamined Patent Application Publication No. 2002-182892
[PTL 2]
   Japanese Unexamined Patent Application Publication No. 2008-52590
[PTL 3]
   Japanese Unexamined Patent Application Publication No. 2009-151424

SUMMARY OF INVENTION

Technical Problem

In the technique of PTL 1, when the user performs an action to select an object, he or she first has to point to a desired object with a pointer; and then has to move the pointer so that the pointer matches a predetermined pattern. However, it is not always easy to accurately move the pointer with respect to the object so that the pointer matches the predetermined pattern.

Moreover, in the technique of PTL 2, when the user performs an action to select an object, he or she first has to point to a desired object using a gesture of pointing with a finger, and then change the gesture to another predetermined one. However, the user would have a great chance of difficulty in changing the gesture, followed by his or her pointing to an object which is different from his or her intended one.

Furthermore, in the technique of PTL 3, the user operates the apparatus while watching an obtained image of himself or herself, which allows the apparatus to easily execute processing corresponding to a guiding frame. When small objects are tightly arranged on a screen, however, the screen arranges small guiding frames each for one of objects. Hence the user cannot easily select an object of his or her desire.

The present invention is conceived in view of the above problems and aims to provide an information processing method and an information processing apparatus to allows a user, who does not hold a special device in his or her hand, to easily perform actions such as a selection of an object on a screen when the user inputs information through movements and gestures of his or her finger.

Solution to Problem

An information processing method according to an aspect of the present invention is performed by an information processing apparatus, for executing predetermined processing in relation to an object displayed on a screen. The information processing method includes: obtaining position information indicating positions detected for two or more parts of an operating body; calculating a control amount on a basis of the positions of the two or more parts, the positions being indicated in the position information; and controlling including (i) displaying, on the screen, a control symbol including (i-a) a first symbol which represents the control amount calculated in the calculating and (i-b) a second symbol which represents a threshold to be a criterion for determining whether or not the control amount satisfies a predetermined condition, and (ii) executing the predetermined processing in a case where the control amount is determined to satisfy the predetermined condition. In addition, an information processing apparatus according to another aspect of the present invention includes: an obtaining unit configured to obtain position information indicating positions detected for two or more parts of an operating body; a calculating unit configured to calculate a control amount on a basis of the positions of the two or more parts, the positions being indicated in the position information; and a control unit configured (i) to display, on the screen, a control symbol including (i-a) a first symbol which represents the control amount calculated in the calculating and (i-b) a second symbol which represents a threshold to be a criterion for determining whether or not the control amount satisfies a predetermined condition, and (ii) to execute the predetermined processing in a case where the control amount is determined to satisfy the predetermined condition.

Advantageous Effects of Invention

An information processing method or an information processing apparatus according to an implementation of the present invention allows a user to easily perform actions such as a selection of an object, without using a special device held in his or her hand.

DESCRIPTION OF EMBODIMENTS

[Summary]

Figure 1:
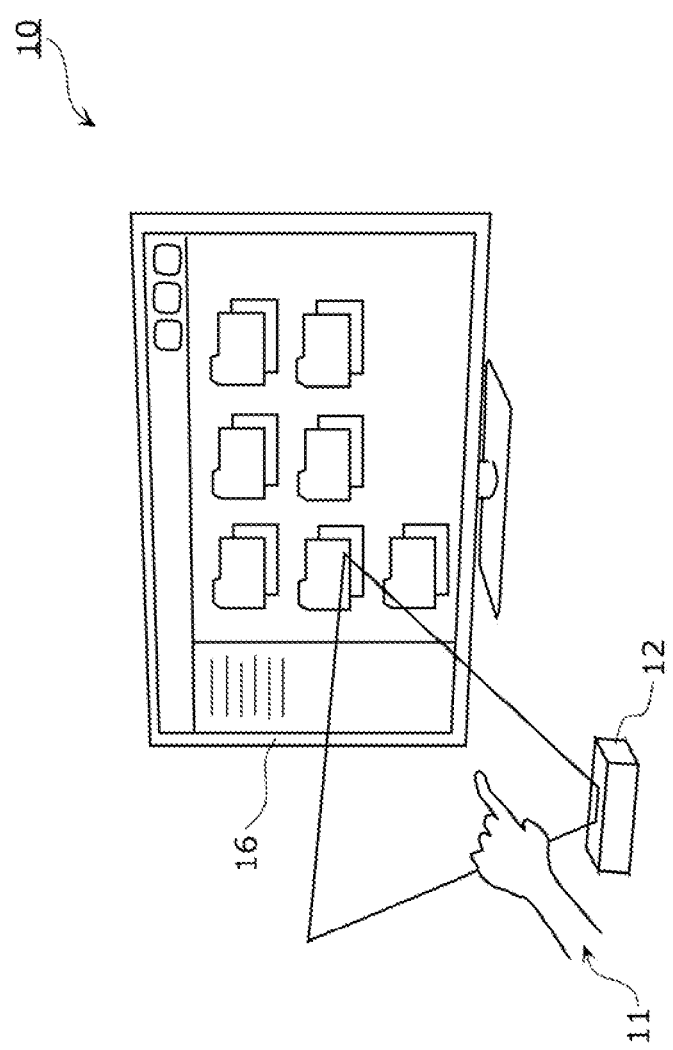
FIG. 1 represents a schematic view of an information input system according to embodiments.

In order for a user to easily perform actions such as a selection of an object without using a special device, an information processing method according to an aspect of the present invention is performed by an information processing apparatus, for executing predetermined processing in relation to an object displayed on a screen. The information processing method includes: obtaining position information indicating positions detected for two or more parts of an operating body; calculating a control amount on a basis of the positions of the two or more parts, the positions being indicated in the position information; and controlling including (i) displaying, on the screen, a control symbol including (i-a) a first symbol which represents the control amount calculated in the calculating and (i-b) a second symbol which represents a threshold to be a criterion for determining whether or not the control amount satisfies a predetermined condition, and (ii) executing the predetermined processing in a case where the control amount is determined to satisfy the predetermined condition. Here, the controlling includes one for devices such as a display device and one for each of the units in the information processing apparatus. In addition, the predetermined processing is one for outputting light and an electric signal. Such predetermined processing includes changing details of the screen displayed by a device such as a display device and processing (such as selection, enlargement, and reduction) in relation to an object on the screen.

Such features allow a user to easily perform actions such as a selection of an object, by moving the position of the operating body (such as a hand, an arm, and a pen), without using a special device. In other words, the user can check, as needed, how predetermined processing is executed by how he or she changes the positions of two or more parts of the operating body, using a control symbol indicating on the screen the control amount and the threshold that reflect the positions of the parts. Consequently, the user can perform an action appropriately.

Here, for example, the controlling may further include displaying a position symbol at a position, on the screen, determined in accordance with one or more of the positions indicated in the position information, and, in the controlling, the predetermined processing may be executed in relation to an object displayed at a display position of the position symbol. It is noted that the display position of the position symbol does not have to directly correspond to a position of any given part of the operating body. For example, based on one or more positions of the parts of the operating body, the average position of the positions may be defined, and the display position may correspond to the average position.

Such features allow the user to move a position of the operating body to designate (point) any given object on the screen with the position symbol (a pointer).

Moreover, for example, the position information may indicate a three-dimensional (3D) position, the information processing method may further include detecting 3D positions of the two or more parts of the operating body, causing sequentially generating the position information, in the obtaining, the position information generated in the detecting may be sequentially obtained, in the controlling, the position symbol and the control symbol may be sequentially displayed on the screen in response to the sequentially obtaining the position information in the obtaining, and in the controlling, the position at which the position symbol is to be displayed on the screen may be a two-dimensional (2D) position obtained through predetermined projection transformation performed on one 3D position determined on a basis of the position information.

Such features make it possible to change a position (a 2D position) of the position symbol (the pointer) on the screen, on the basis of the position of the operating body in the 3D space. Consequently, the user can easily designate any given object by checking the screen.

In addition, the second symbol may include a pictorial figure indicating the threshold and formed in a predetermined size, and the first symbol may include a pictorial figure which is homologous to the pictorial figure included in the second symbol and formed in the predetermined size, the pictorial figure in the first symbol reflecting the control amount in a size of the pictorial figure in the first symbol. It is noted that the homology between the symbols is sufficient as far as the shapes thereof are homologous at the first glance even though the pictorial figures are different in outline, such as solid line, broken line, and wavy line, and in color.

Such features allow the user to compare the first symbol with the second symbol, both of which are pictorial figures on the screen, and perform an operation so that the sizes of both the symbols match with each other. Hence, the user can easily perform actions such as selection of an object.

Moreover, the pictorial figure included in the second symbol and formed in the predetermined size may be a circle used for indicating the threshold and formed in a predetermined size, and the first symbol may include a circle obtained through predetermined projection transformation performed on a smallest sphere including the positions used as the basis for the calculation of the control amount, the circle in the first symbol being concentrically arranged with the circle in the second symbol.

Such features allow the user to change the size of the circle representing a control amount on the screen, by using his or her hand as the operating body and opening and closing the hand. Hence the user can perform selection of an object etc. with an intuitive action.

The information processing method may further include identifying one of the two or more parts of the operating body, wherein the display position of the position symbol on the screen may be a 2D position obtained through the predetermined projection transformation performed on a 3D position indicated in the position information on the one part identified in the identifying, the smallest sphere may have, as a center, a position of the one part identified in the identifying, and in the calculating, the control amount may be calculated (i) with reference to the position of the one part identified in the identifying and (ii) in accordance with an other position of at least one of the two or more, parts of the operating body that is different from the one part identified in the identifying.

Such features allow the user to move the position of the position symbol on the screen, by using, for example, his or her hand as the operating body and moving a particular part of the operating body, such as the thumb or the pointing finger. Moreover, the user can easily perform actions such as selection of an object by moving another part of the operating body other than the particular part.

Furthermore, the second symbol may include a line segment having a predetermined gradient for indicating the threshold, and the first symbol may include a line segment reflecting the control amount in a gradient of the line segment, the line segment in the first symbol and the line segment in the second symbol passing through a same point.

Such features allow the user to compare the first symbol with the second symbol, both of which are pictorial figures on the screen, and perform an operation so that the gradients (for example, the angles with respect to the horizontal direction) of both the symbols match with each other. Hence, the user can easily perform actions such as selection of an object.

In addition, the line segment in the first symbol may be obtained through predetermined projection transformation performed on a regression line found closest to the positions used as the basis for the calculation of the control amount, the information processing method may further include identifying one of the two or more parts of the operating body, in the controlling, the display position of the position symbol on the screen may be a 2D position obtained through the predetermined projection transformation performed on a 3D position indicated in the position information on the one part identified in the identifying, the regression line may be a straight line passing through the 3D position indicated in the position information on the one part identified in the identifying, and in the calculating, the control amount may be calculated on a basis of an other position of at least one of the two or more parts of the operating body, the at least one part of the operating body being different from the one part identified in the identifying.

Such features allow the user to move the position of the position symbol on the screen, by using, for example, his or her hand as the operating body and moving (i) a particular part of the operating body, such as the thumb or the pointing finger, and (ii) another part of the operating body other than the particular part. Hence the user can easily perform actions such as selection of an object.

Moreover, the information processing method may further include identifying one of the two or more parts of the operating body, wherein, in the controlling, the display position of the position symbol on the screen may be a 2D position obtained through the predetermined projection transformation performed on a 3D position indicated in the position information on the one part identified in the identifying.

Such features allow the user to move the position of the position symbol on the screen, by using, for example, his or her hand as the operating body and moving a particular part of the operating body, such as the thumb or the pointing finger.

Here the predetermined relationship including the equivalence relationship or a magnitude relationship is, for example, one of the cases where (i) the control amount matches the threshold, (ii) the control amount is larger than the threshold, (iii) and the control amount is smaller than the threshold.

When, for example, the predetermined condition is to be satisfied if the control amount matches the threshold, the user operates the operating body with reference to the screen so that the first symbol and the second symbol match with each other, both of which are the control symbols on the screen. Hence the user can easily causes an information processing apparatus to execute predetermined processing such as selection of an object.

Furthermore, in the controlling, the predetermined condition may be determined to be satisfied in a case where the control amount changes, causing a change in magnitude relationship between the control amount and the threshold.

Such features allow the information processing apparatus to execute predetermined processing only in the case where, based on an operation by the user to move each of the parts of the operating body, (i) the control amount changes from a value smaller than the threshold to a value larger than the threshold and (ii) the control amount changes from a value larger than the threshold to a value smaller than the threshold. Hence predetermined processing is kept from repeating even though, for example, the control amount and the threshold match with each other while each of the parts of the operating body stays still.

In addition, wherein, in the controlling, the predetermined condition may be determined to be satisfied only in one of cases where (i) the control amount changes from a value smaller than the threshold to a value larger than the threshold and (ii) the control amount changes from a value larger than the threshold to a value smaller than the threshold.

Such features allow the information processing apparatus to perform predetermined processing in only one of the cases where, based on an operation by the user to move each of the parts of the operating body, (i) the control amount changes from a value smaller than the threshold to a value larger than the threshold and (ii) the control amount changes from a value larger than the threshold to a value smaller than the threshold.

Moreover, the position information may indicate a 3D position, the information processing method may further include detecting 3D positions of the two or more parts of the operating body, causing generating the position information, the obtaining may include obtaining the position information generated in the detecting, and the controlling may include (i) displaying the control symbol at a 2D position found on the screen and obtained through predetermined projection transformation performed on one 3D position determined on a basis of the position information, and (ii) executing the predetermined processing in relation to an object displayed at a display position of the control symbol in a case where the control amount is determined to satisfy the predetermined condition. Displaying, on the screen, a control symbol at a 2D position obtained through predetermined projection transformation performed on one 3D position determined on a basis of the position information includes, for example, displaying the control symbol so that the 2D position is included within the smallest rectangle surrounding the control symbol. This includes, for example, that the control symbol is displayed so that the center of the first symbol in the control symbol is the 2D position Such features allow the user to designate any given object on the screen using the control symbol, by moving the position of the operating body.

In addition, an information processing apparatus according to another aspect of the present invention includes: an obtaining unit configured to obtain position information indicating positions detected for two or more parts of an operating body; a calculating unit configured to calculate a control amount on a basis of the positions of the two or more parts, the positions being indicated in the position information; and a control unit configured (i) to display, on the screen, a control symbol including (i-a) a first symbol which represents the control amount calculated in the calculating and (i-b) a second symbol which represents a threshold to be a criterion for determining whether or not the control amount satisfies a predetermined condition, and (ii) to execute the predetermined processing in a case where the control amount is determined to satisfy the predetermined condition. Here, the control in the controlling includes control for devices such as a display device and control for each of the units in the information processing apparatus. In addition, the predetermined processing is processing for outputting light and an electric signal. Such predetermined processing includes changing details of the screen displayed by a device such as a display device and processing (such as selection, enlargement, and reduction) in relation to an object on the screen.

Such features allow a user to easily perform actions such as a selection of an object, by moving the position of an operating body (such as a hand, an arm, and a pen), without using a special device.

It is noted that these overall and specific aspects include one of or a combination of forms such as an apparatus, a system, a method, an integrated circuit, a computer program, a computer-readable recording medium.

Described hereinafter are embodiments, with reference to the drawings.

Any of the embodiments below is a specific and beneficial example of the present invention. The numerical values, shapes, materials, constituent elements, arrangement positions of and connecting schemes between the constituent elements, steps, and an order of the steps all described in the embodiment are examples, and shall not limit the present invention. Among the constituent elements in the embodiments, those not described in an independent claim representing the most generic concept of the present invention can arbitrarily be added to the present invention. In addition, each of the drawings is a schematic view, and is not necessarily illustrated in detail.

The embodiments describe an information input system which provides a GUI that utilizes, as input information, a position of an operating body in a 3D space detected by apparatuses such as a camera. A conventional information input system, which utilizes information including a position in a 3D space as input information, does not employ a technique for selection and determination with an intuitive and direct operation, contrary to input via a mouse and a touch panel.

In executing a pointing (in other words, moving a pointer on a screen) operation, the information input system has to be better devised in order to handle a sequence of operations including the pointing operation and a selecting operation.

One of possible techniques is to recognize that the selecting operation is performed when the user makes a specific gesture, and discriminate the selecting operation from the pointing operation. For example, the technique would be to recognize that the selecting operation is performed when the user makes a specific gesture; that is to stop his or her hand at the object for a while, and discriminate the selecting operation from the pointing operation. In such a technique, however, the user has to stop an operating body at the object while performing the pointing operation of moving the operating body. Consequently, the selecting operation is neither instantaneous nor comfortable. Another possible technique would be to recognize the selecting operation when the user made a specific gesture such as swinging his or her hand around or moving the hand forward. Such a technique, however, could initiate the pointing operation between the start of moving the hand of the user and the recognition of performing the selecting operation. This cannot clearly differentiate the selecting operation from the pointing operation and fails to implement an accurate operation. Still another possible technique would be to recognize the selecting operation when the user says "Select!" or "Enter!", apart from input of the position of the operating body. The technique to utilize voice recognition, however, requires extra costs for equipment such as a microphone, and relies on the voice recognition rate. Consequently, the technique does not necessarily implement an accurate operation.

Hence, in particular, the embodiments describe an information input system on which a user can intuitively perform operations such as selection and carry out a sequence of operations including a pointing operation and a selecting operation.

Mainly, the information input system executes such operations as calculating a control amount based on a detected position of each of parts of an operating body, displaying, on a screen, a control symbol indicating the control amount and a threshold, and selecting an object on the screen if the control amount satisfies a predetermined condition in relation to the threshold. An information processing apparatus included in the information input system employs an information processing method for calculating a control amount based on a detected position of each of parts of an operating body, and for displaying, on a screen, a control symbol which includes a symbol representing the control amount and a symbol representing a threshold to be a criterion for determination indicating whether or not the control amount satisfies a predetermined condition.

[Embodiment 1]

Described hereinafter is an information input system 10 according to Embodiment 1, with reference to FIGS. 1 to 8.

FIG. 1 represents a schematic view of information input system 10. Illustrated here are a stereo camera 12 and a display apparatus 16. Moving an operating body 11 (here a finger of a user) within the capturing coverage of the stereo camera 12, the user can move a pointer found on the display apparatus 16 and displayed in association with a position of the operating body 11 in the 3D space. Such a feature makes it possible to implement various interactions between the user and an image displayed on the display apparatus 16.

It is noted that the operating body 11 shall not be limited to a finger of the user; instead, the operating body 11 may be a hand and an arm of the user, or items such as a pen which the user is holding.

Figure 2:
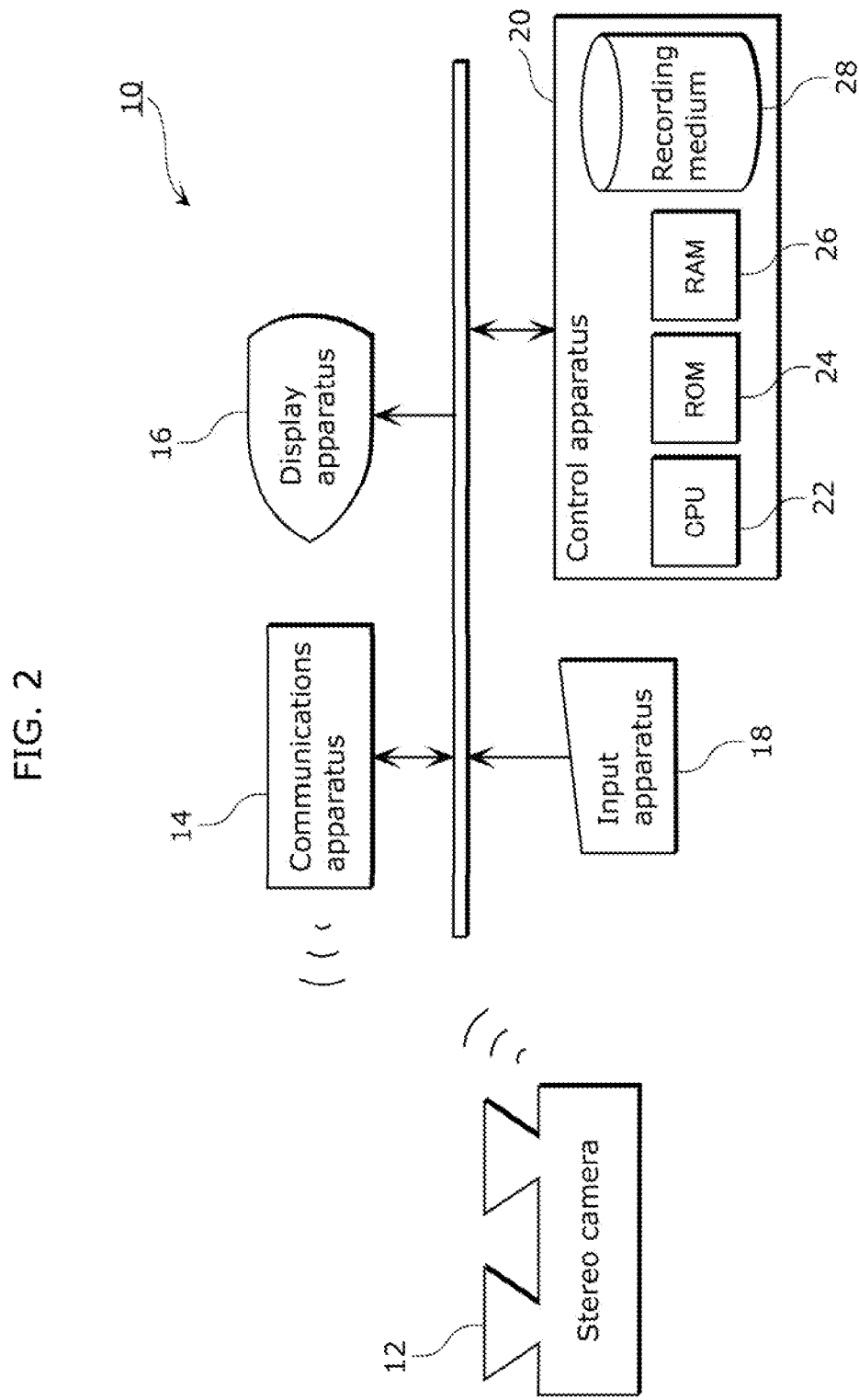
FIG. 2 represents a diagram illustrating a hardware structure of the information input system according to the embodiments.

FIG. 2 represents a diagram illustrating a hardware structure of the information input system 10.

The information input system 10 obtains an instruction of the user to an image displayed on the display apparatus 16, and includes the stereo camera 12, a communications apparatus 14, the display apparatus 16, an input apparatus 18, and a control apparatus 20.

The stereo camera 12, which is an imaging apparatus, is equipped with at least two cameras, and acts as a sensor to detect a position of the operating body 11 in the 3D space. The stereo camera 12 obtains images of the operating body 11 at a constant frame rate, and wirelessly transmits the obtained images to the communications apparatus 14. Here the stereo camera 12 is an independent apparatus from other apparatuses such as the display apparatus 16; instead, the stereo camera 12 may be combined with the display apparatus 16.

The communications apparatus 14 is a wireless communications interface and the like to obtain an image transmitted from the stereo camera 12 and send the image to the control apparatus 20.

The display apparatus 16 is a liquid crystal display and the like with a screen for displaying an image to be provided to the user. It is noted that the display apparatus 16 may be a projector for projecting an image onto a screen and the like.

The input apparatus 18 is such as a power button and a remote control. It is noted that, in Embodiment 1, every instruction is given to the control apparatus 20 via the stereo camera 12. Hence the input apparatus 18 is a subsidiary constituent element.

The control apparatus 20 is a computer (information processing apparatus) to execute information processing which implements interactions with the user, and includes a central processing unit (CPU) 22, a read only memory (ROM) 24, a random access memory (RAM) 26, and a recording medium 28. The CPU 22 is a processor to execute a program. The ROM 24 is a read-only memory which previously holds the program and data. The RAM 26 is a memory when the CPU 22 executes the program. The recording medium 28 is a computer-readable-and-writable recording apparatus such as a hard disc drive which can record data when the power is not on. It is noted that the recording medium 28 may be, for example, a non-volatile memory.

It is noted that essential hardware for the information input system 10 may be the control apparatus 20. More specifically, the essential hardware may be a computer to execute a program. This is because a typical information input system according to the embodiments is implemented in the form of software. Thus the other peripheral devices are non-mandatory constituent elements, and may be implemented as the information input system when needed. In addition, both the ROM 24 and the recording medium 28 are non-volatile recording apparatuses, and either one may be included in the information input system.

Figure 3:
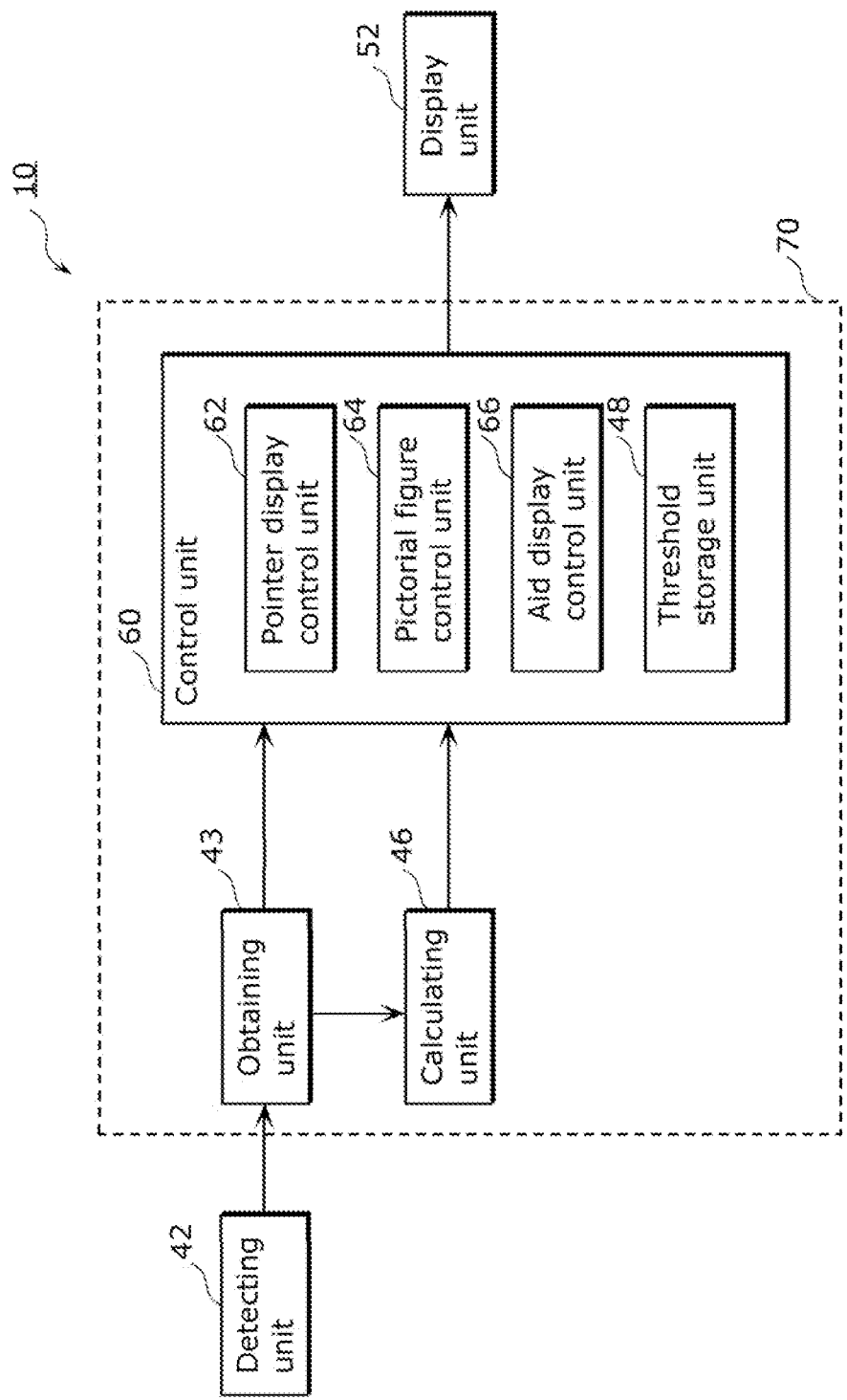
FIG. 3 represents a functional block diagram of an information input system according to Embodiment 1.

FIG. 3 represents a functional block diagram of the information input system 10 according to Embodiment 1. The functional block illustrates a functional structure of the information input system 10 implemented in the form of the hardware structure illustrated in FIG. 2.

Functionally, the information input system 10 is used to obtain a user operation directed to an image displayed on a display unit 52. The information input system 10 includes a detecting unit 42, an information processing unit 70, and the displaying unit 52. Here the information processing unit 70 is a processing system to perform screen display control and the like, using the 3D position. The information processing unit 70 is implemented by the control apparatus 20 and includes an obtaining unit 43, a calculating unit 46, and a control unit 60. It is noted that the display unit 52 is equivalent to the display apparatus 16 in FIG. 2, and, as described above, is not mandatory for the information input system 10.

The detecting unit 42 is a processing unit for detecting (measuring) positions of at least two of the parts of the operating body 11 in the 3D space. For the detection of the positions, exemplified here is a case where the operating body 11 is predetermined as the five fingers and the palm of one hand of a person. Here, from each of the two images simultaneously obtained by the stereo camera 12, the detecting unit 42 identifies positions of each of the fingers and the palm in the two images by image matching based on previously-set image data including shapes of each finger and the palm. Then, based on the identified positions and data including a position of each of cameras in the stereo camera 12 and a distance between the cameras, the detecting unit 42 calculates a position of each finger and the palm in the 3D space to detect the 3D position of the operating body 11 (specifically each of the two or more parts of the operating body 11). The detected 3D position of each finger and the like is represented as a coordinate value P (x, y, z) with reference to three perpendicular axes (an X-axis, a Y-axis, and a Z-axis) in the 3D space.

The obtaining unit 43 is capable of obtaining the 3D position, of the operating body 11, detected by the detecting unit 42, and of providing the obtained 3D position to the calculating unit 46 and the control unit 60. In other words, the obtaining unit 43 acts as an input interface included in the information processing unit 70 and used for inputting the 3D position.

The calculating unit 46 is capable of calculating a control amount based on at least two of the positions of the parts of the operating body 11 found in the 3D space detected by the detecting unit 42 and obtained by the obtaining unit 43. Then the calculating unit 46 is capable of providing the calculated control amount to the control unit 60. Here the control amount changes when the user performs an operation to move the operating body 11 to indicate his or her intension such as selection. The control amount reflects positions of two or more of the parts of the operating body 11. For example, the calculating unit 46 calculates the smallest sphere including 3D positions of multiple parts (for example, the five fingers and the palm of one hand) of the operating body 11 in the 3D space, and calculates the radius of the sphere as the control amount. In other words, calculating the control amount may also be referred to as, in a sense, determining a positional relationship pictorial figure (for example, a pictorial figure of a sphere having the radius of the control amount and projected onto a predetermined two-dimensional plane) representing a positional relationship of each of the parts. If the control amount satisfies a predetermined condition, in other words if the relationship between the control amount and a predetermined threshold satisfies a predetermined condition (such as a predetermined equivalence relationship and a predetermined magnitude relationship), the control unit 60 recognizes the operation as selection and the like.

Based on the 3D position, of the operating body 11, obtained by the obtaining unit 43 and the control amount calculated by the calculating unit 46, the control unit 60 executes control such as updating screen display and predetermined processing related to an object displayed on the screen. As the update of the screen display, the control unit 60 executes control for (i) displaying a pointer (position symbol) at a position found on the screen and determined in accordance with the current 3D position of the operating body 11 and (ii) displaying a control symbol (pictorial figure) for indicating a control amount determined in relation to the operating body 11. The position symbol and the control symbol are constituent elements of a GUI, as well as display elements to be subjects of an interaction with the user. Moreover, the control unit 60 recognizes an action of the user and executes a function corresponding to the action. In other words, the control unit 60 determines whether or not an operation, such as selection, is performed based on whether or not the control amount satisfies a predetermined condition. If the operation, such as selection, is performed, the control unit 60 executes predetermined processing related to the object displayed at the position where the pointer is displayed. The predetermined processing includes, for example, updating a form of displaying the object (such as enlargement, reduction, rotation, transformation, and deletion) and executing a predetermined function corresponding to the object (such as, if the object is an icon associated with a function processing program, execution of the function processing, program). It is noted that the predetermined processing includes outputting light, an electric signal and the like out of the control apparatus 20.

As functional constituent elements, the control unit 60 includes a pointer display control unit 62, a pictorial figure display control unit 64, an aid display control unit 66, and a threshold storage unit 48.

Based on a 3D position transmitted from the obtaining unit 43 and indicating each of the parts of the operating body 11, the pointer display control unit 62 is capable of executing control for determining a position on the screen of the display unit 52 and displaying a pointer (position symbol) at the determined position. In order to determine the display position, the pointer display control unit 62 calculates one 3D position, performs predetermined projection transformation on the one 3D position to calculate a 2D position, and determines the 2D position as the display position. Here the one 3D position is calculated, for example, by averaging the 3D positions of the parts of the operating body 11. It is noted that the pointer is a position symbol found on the screen and having a specific shape (cross-like figure, for example) and or a specific color (red, for example). It is noted that, instead of performing the predetermined projection transformation on the average value of the parts of the operating body 11, the pointer display control unit 62 may perform the predetermined projection transformation on a 3D position of one of the parts of the operating body 11 to obtain a 2D position, and determine the 2D position as the display position of the pointer on the screen. In addition, the predetermined projection transformation is to convert into, for example, a 2D coordinate plane used for display and parallel to the screen of the display unit 52. The projection transformation may be, for example, parallel projection transformation or perspective projection transformation.

The pictorial figure display control unit 64 is capable of executing control for displaying a first symbol on a screen of the display unit 52. Here the first symbol is an image of a pictorial figure whose size reflects the degree of the control amount calculated by the calculating unit 46. Here the first symbol is a part of the control symbol. For example, when the calculating unit 46 (i) calculates the smallest sphere including 3D positions of multiple parts of the operating body 11 in the 3D space, and (ii) calculates the radius of the sphere as a control amount, the first symbol is a circle obtained through predetermined projection transformation performed on the sphere having the radius.

The threshold storage unit 48 is implemented in a form of an area of a RAM 25 or the recording medium 28, and is capable of storing a threshold as a reference to be used to determine whether or not the control amount satisfies the predetermined condition. For example, the threshold can be represented in at least one of the size and the direction of the pictorial figure. It is noted that if the control unit 60 has multiple processing items to execute when the control amount satisfies the predetermined condition, the threshold storage unit 48 may store, for each of the processing items, the threshold in association with the processing item. Here the threshold acts as information for an action recognition reference used to recognize that in response to which processing item the user performs an action. It is noted that the threshold is set by a manufacturer, an administrator, or a user of the information input system 10 within the range where the control amount may change. For example, when the threshold is for the case where the control amount is calculated as the radius of the smallest sphere including the positions of the fingers of one hand and its palm, the control amount can be assumed to change within an exemplary range of approximately 4 cm to 10 cm. Thus an exemplary threshold for selection is 6 cm. Furthermore, for example, a threshold for selection cancel may be determined as 9 cm. The selection may be made when the radius changes from a value larger than 6 cm to a value smaller than or equal to 6 cm, and the selection cancel may be made when the radius changes from a value smaller than 9 cm to a value larger than or equal to 9 cm.

The aid display control unit 66 is capable of executing control for displaying a second symbol on the screen of the display unit 52. Here the second symbol is a pictorial figure whose size reflects the degree of the threshold stored in the threshold storage unit 48. Here the second symbol is a part of the above control symbol. For example, the second symbol is a circle obtained through predetermined projection transformation performed on a sphere whose radius is the threshold. For example, the second symbol is a circle which is concentrically arranged with another circle acting as the first symbol. The ratio of the threshold to the control amount conforms to that of the radius of the circle acting as the second symbol to the radium of the other circle acting as the first symbol. It is noted that when the user desires to execute an operation such as selection, he or she moves the operating body 11 while visually checking, on the screen, the relationship of the first symbol to the second symbol in order to change the first symbol on the screen. In other words, the second symbol is an image for aiding the user in an operation such as selection when he or she moves the operating body 11 while watching the first symbol. Displaying the second symbol close to the first symbol could improve effectiveness of the second symbol as an aid to an operation.

It is noted that the calculating unit 46 calculates the smallest sphere including 3D positions of the multiple parts of the operating body 11 and calculates the radius of the sphere as a control amount; instead, the calculating unit 45 may calculate the control amount as described below. For example, the calculating unit 46 may calculate, from the 3D positions of the multiple parts of the operating body 11, a regression line obtained by techniques such as the least-square technique and passing through the closest point to each of the 3D positions, and calculate, as a control amount, the gradient of a line segment obtained through predetermined projection transformation performed on the calculated regression line. The predetermined projection transformation is to convert into, for example, a 2D coordinate plane used for display and parallel to the screen of the display unit 52. When the line segment obtained through the projection transformation is drawn on the screen, the gradient of the line segment as the control amount is represented by an angle between the line segment and, for example, the horizontal direction of the screen. Here the pictorial figure display control unit 64 may cause, for the regression line, a line segment (a line segment in accordance with the control amount) to be displayed on the screen of the display unit 52 as the first symbol. Here the line segment is obtained as a result of the projection transformation for the 2D coordinate plane used for display. Furthermore, the aid display control unit 66 may cause a line segment to be displayed on the screen of the display unit 52 as the second symbol. Here the line segment passes through the line segment in accordance with the control amount, and the gradient of the line segment to the horizontal direction conforms to the threshold (here the value of the gradient) stored in the threshold storage unit 48.

In other words, using the pictorial figure display control unit 64 and the aid display control unit 66, the control unit 60 causes the first symbol and the second symbol to be displayed on the screen of the display unit 52. The first symbol is a pictorial figure including a circle, a line segment, and a polygon, and having the control amount reflected in the size or the orientation (gradient) thereof. In addition, the second symbol is a pictorial figure including a circle, a line segment, and a polygon (such as a triangle and a square), and having a threshold of the control amount reflected in the size or the orientation (gradient) thereof. Here the control amount is a criterion for determination of an operation such as selection. The control unit 60 compares a threshold with the control amount calculated by the calculating unit 46, and determines whether or not the control amount satisfies a predetermined condition. If the control amount conforms to the threshold, the first symbol and the second symbol to be displayed on the screen are to conform to each other in size and orientation.

The control unit 60 recognizes that a predetermined action such as selection is performed if the first symbol and the second symbol conform to each other in either size or orientation—that is if the control amount and the threshold conform to each other. In recognizing that the predetermined action is performed, the control unit 60 executes a predetermined function in response to the predetermined action. Here the predetermined function is previously defined.

It is noted that the control unit 60 executes the predetermined function if the control amount satisfies the predetermined condition—that is if the relationship between the control amount and a predetermined threshold satisfies a predetermined condition (such as a predetermined equivalence relationship and a predetermined magnitude relationship). The relationship can be modified other than the conformity of the control amount with the threshold. The control unit 60 may recognize that the predetermined action is performed in the case where the size of the first symbol, which is larger than that of the second symbol, becomes smaller than that of the second symbol—that is in the case where the control amount changes from a value larger than a value to a value smaller than the threshold. Furthermore, the control unit 60 may recognize that the predetermined action is performed in the case where the first symbol changes in size so that the first symbol, which is smaller than the second symbol, becomes larger than the second symbol—that is in the case where the control amount changes from a value smaller than a value to a value larger than the threshold. Moreover, the control unit 60 may recognize that the same predetermined action is performed in each of the cases where (i) the first symbol changes in size so that the first symbol, which is larger than the second symbol, becomes smaller than the second symbol and (ii) the first symbol changes in size so that the first symbol, which is smaller than the second symbol, becomes larger than that of the second symbol. The control unit 60 may also recognize that a different predetermined action is performed in both of such cases. It is noted that the control unit 60 may recognize that a predetermined action is performed in the case where the first symbol changes in gradient (an angle formed with a certain orientation) so that the gradient of the first symbol, which is larger than that of the second symbol, become smaller than that of the second symbol. In addition, the control unit 60 may recognize that a predetermined action is performed if the gradient of the first symbol changes so that the gradient of the first symbol, which is smaller than that of the second symbol, become larger than that of the second symbol. Moreover, the control unit 60 may recognize that the same predetermined action is performed in each of the cases where (i) the gradient of the first symbol changes so that the gradient of the first symbol, which is larger than that of the second symbol, becomes smaller than that of the second symbol and (ii) the gradient of the first symbol changes so that the gradient of the first symbol, which is smaller than that of the second symbol, becomes larger than that of the second symbol. The control unit 60 may also recognize that a different predetermined action is performed in both of such cases.

It is noted that a function to display, on the screen of the display unit 52, an image including one or more objects to be selected and the like is a well-known and general display function, therefore, the details thereof shall not be described.

Described next is an operation of the above-structured information input system 10. The description is made on the assumption in the case where the user moves an operating body and performs a predetermined action, such as selection, on any given object when the screen includes multiple objects.

Figure 4:
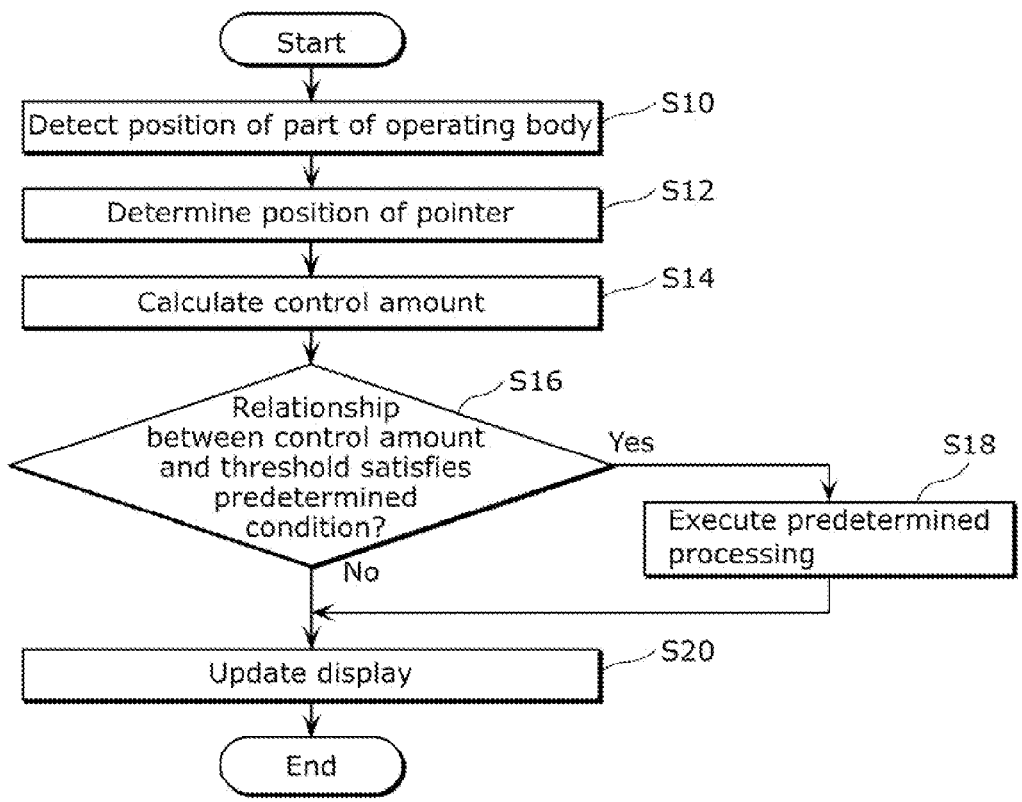
FIG. 4 represents a flowchart of an operation of the information input system according to Embodiment 1.

FIG. 4 represents a flowchart of an operation of the information input system 10.

First, the detecting unit 42 detects at least two of the parts of the operating body 11 in the 3D space (Processing Step S10). Assumed here is the case where the operating body 11 is one hand, and the detecting unit 42 is previously set to determine the 3D positions of the five fingers. 3D positions of the fingers detected by the detecting unit 42 are obtained by the obtaining unit 43, and transmitted to the control unit 60 and the calculating unit 46.

When the positions of the parts (the positions of the fingers) of the operating body 11 detected by the detecting unit 42 are transmitted by the obtaining unit 43, the control unit 60 determines a position, on the screen, where a pointer is to be displayed based on a position of at least one of the parts (Processing Step S12). Specifically, for example, the pointer display control unit 62 calculates an average position found in the middle of the 3D positions between the pointing finger and the thumb, calculates a 2D position obtained through predetermined projection transformation performed on the average position, and determines the 2D position as a display position of the pointer on the screen. Hence, in the proceeding Processing Step S20, the pointer is to be displayed at the determined display position on the screen of the display apparatus 16 (the display unit 52).

Moreover, informed of each of the 3D positions, the calculating unit 46 calculates a control amount in accordance with at least two or more of the 3D positions (Processing Step S14). Specifically, for example, the calculating unit 46 calculates the smallest sphere having, as the center, the average position of the 3D positions of the five fingers, and including the 3D positions of the pointing finger and the thumb.

When the calculating unit 46 calculates the control amount, the control unit 60 determines whether or not the calculated control amount satisfies a predetermined condition—that is whether or not the relationship between the control amount and a predetermined threshold satisfies the predetermined condition (Processing Step S16).

If determining that the control amount satisfies the predetermined condition, the control unit 60 executes a predetermined function (Processing Step S18). The predetermined function is, for example, to execute predetermined processing in relation to an object displayed at the display position of the pointer on the screen of the display apparatus 16. A specific example of the predetermined function is one of (i) setting the object to the selection state (such as to change and emphasize the appearance of the object to slightly enlarge and the like), (ii) enlarging the shape of the object, and (iii) reducing the shape of the object.

Then the control unit 60 executes control for updating a displayed detail on the screen of the display apparatus 16 (Processing Step S20). Specifically, the pointer display control unit 62 in the control unit 60 forms a display image for displaying the pointer (position symbol) at the position, on the screen, determined in the Processing Step S12. Furthermore, for example, the pictorial figure display control unit 64 forms a display image for displaying, on the screen, the first symbol including a circle obtained through predetermined projection transformation (the same projection transformation performed in the Processing Step S12) performed on the sphere having, as the radius, the control amount determined by the calculating unit 46. Moreover, for example, the aid display control unit 66 forms a display image for displaying on the screen the second symbol including a circle obtained through the same predetermined projection transformation performed on a sphere (i) whose center point is the same as that of the sphere having, as the radius, the control amount to be the basis of the first symbol and (ii) whose radius is a threshold. Thus the circle of the first symbol is concentrically arranged with the circle of the second symbol. Then, based on the display images formed by each of the units, the control unit 60 provides the display apparatus 16 with an image signal formed for displaying, on the screen of the display apparatus 16, the control symbol including the first symbol and the second symbol and the pointer.

The Processing Steps S10 to S20 are sequentially repeated. Hence the detecting unit 42 sequentially detects the positions of the parts of the operating body 11, the obtaining unit 43 sequentially obtains the detected positions and transmits the positions to the control unit 60, and the control unit 60 sequentially updates the display details on the screen of the display apparatus 16. Hence, in addition to multiple objects, the screen of the display apparatus 16 displays a control symbol and a pointer which change in response to the motion of the operating body 11 moved by the user.

Figure 5:
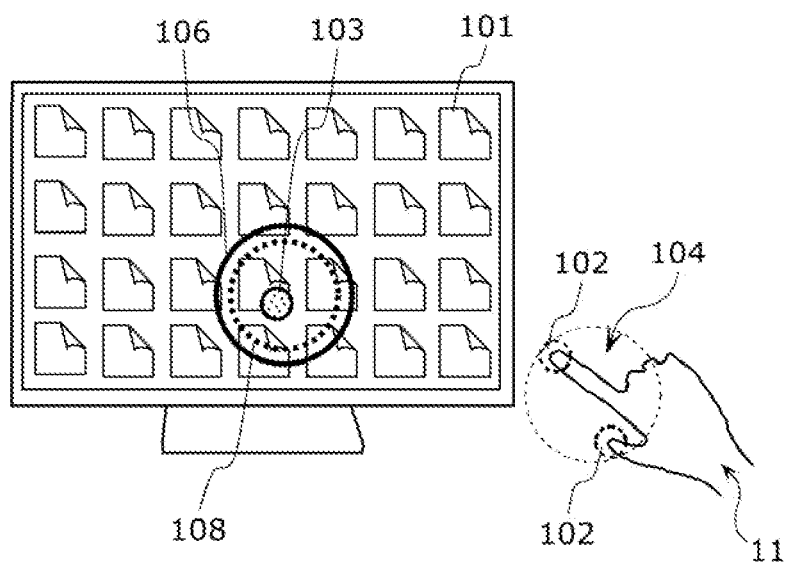
FIG. 5 represents a diagram exemplifying an operation and a screen of the information input system according to Embodiment 1.

FIG. 5 represents an exemplary GUI provided by the information input system 10. In the example, multiple objects 101 are horizontally and vertically arranged and displayed on the screen of the display apparatus 16 (display unit 52).

The example illustrates that the user is about to select (before selection) one of the objects displayed on the screen, using the motion of the operating body 11. In other words, based on points 102 of the parts of the operating body 11, the screen displays a pointer 103 to be displayed at a 2D position obtained through predetermined projection transformation performed on an average position found in the middle of the pointing finger and the thumb. Furthermore, in order to indicate a control amount based on the positions 102 of the parts of the operating body 11, the screen displays a first symbol 106. Here the control amount is the radius of a sphere 104 that is the smallest sphere having, as the center, the average position of the five fingers and including the positions of the pointing finger and the thumb. The first symbol 106 is a circle obtained through predetermined projection transformation performed on the sphere 104. In addition, the screen displays a second symbol 108 as a circle obtained through the same predetermined projection transformation performed on the sphere 104 observed on the assumption that the radius of the sphere 104 conforms to the threshold.

Figure 6:
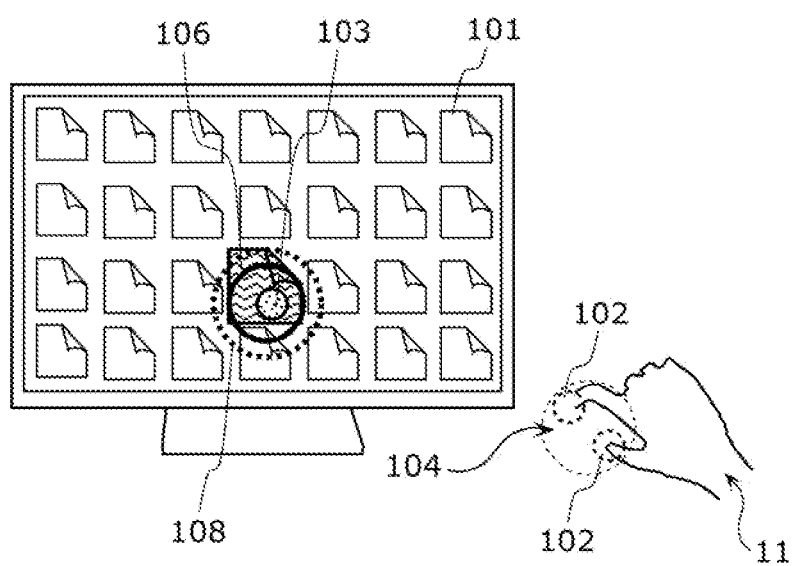
FIG. 6 represents a diagram exemplifying changes from FIG. 5 in the operation and the screen of the information input system according to Embodiment 1.

Following the state illustrated in FIG. 5, FIG. 6 illustrates the case where the user moves the operating body 11 and selects an object.

FIG. 6 represents a diagram exemplifying a GUI, following the state exemplified in FIG. 5. The example illustrates that the user has selected (immediately after selection) one of the objects displayed on the screen, using the motion of the operating body 11. The user narrows the distance between the positions 102 of the pointing finger and the thumb. Based on the points 102 of the parts of the operating body 11, the screen displays the pointer 103 to be displayed at the 2D position obtained through the predetermined projection transformation performed on the average position found in the middle of the pointing finger and the thumb. Furthermore, in order to represent a control amount which is the radius of the sphere 104 that is the smallest sphere (a sphere smaller than the exemplary one in FIG. 5) having, as the center, the average position of the five fingers and including the positions of the pointing finger and the thumb, the first symbol 106 is displayed as a circle (a circle smaller than the exemplary one in FIG. 5) obtained through predetermined projection transformation performed on the sphere 104. In addition, the second symbol 108 is displayed as a circle obtained through the same predetermined projection transformation performed on the sphere 104 observed on the assumption that the radius of the sphere 104 conforms to the threshold. Following the screen illustrated in FIG. 5, the screen in FIG. 6 illustrates that the size of the first symbol 106 (a heavy-line circle in FIG. 5) has changed smaller than the size of the second symbol 108 (a broken-line circle in FIG. 6) working as an aid for an operation of the operating body 11. When such operations are performed, for example, the control unit 60 recognizes that the user has performed a predetermined action (selection, in this example). Then, as represented in FIG. 6, the object displayed at the display position of the pointer 103 is selected (the object is highlighted).

Described below is another example than the exemplary GUI described above. In the above example, the first symbol and the second symbol are circles. In this example, the first symbol and the second symbol are line segments.

Figure 7:
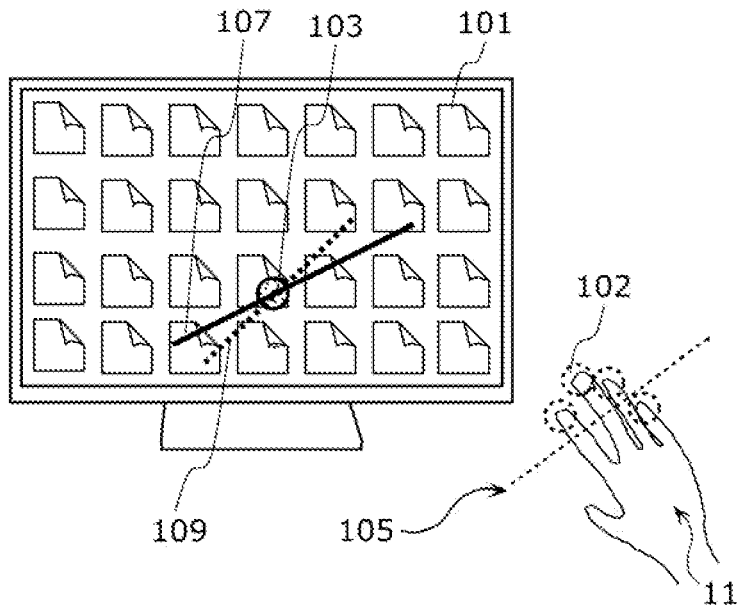
FIG. 7 represents a diagram exemplifying an operation and a screen of the information input system according to Embodiment 1.

FIG. 7 represents another exemplary GUI provided by the information input system 10. In this example, as well, the multiple objects 101 are horizontally and vertically arranged and displayed on the screen of the display apparatus 16 (display unit 52). The example illustrates that the user is about to select (before selection) one of the objects displayed on the screen, using the motion of the operating body 11. In other words, based on the positions 102 of the pointing finger, the middle finger, the ring finger, and the little finger of the operating body 11 the screen displays the pointer 103 presented at a 20 position obtained through predetermined projection transformation performed on the average position of the positions 102. Moreover, in order to indicate a control amount, the screen displays a first symbol 107. Here the control amount is a gradient of a line segment with respect to the line segment's horizontal direction, and the line segment (i) passes through the average position of the positions 102 of the pointing finger, the middle finger, the ring finger, and the little finger, and (ii) is obtained through predetermined projection transformation performed on a regression line 105 passing closest to the positions 102. The first symbol 107 is the line segment. Moreover, the screen displays a second symbol 109 which is a line segment that (i) passes through a position obtained through predetermined projection transformation performed on the average position, and (ii) indicates a threshold with the gradient thereof.

Figure 8:
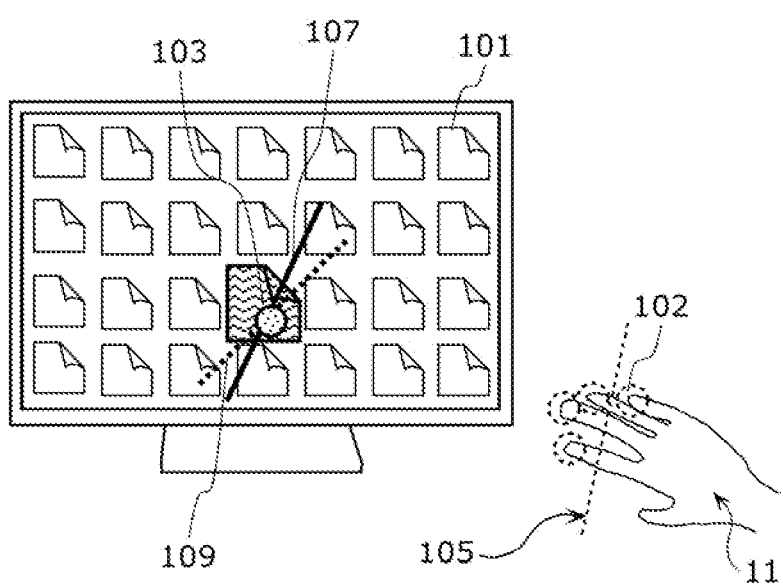
FIG. 8 represents a diagram exemplifying changes from FIG. 7 in the operation and the screen of the information input system according to Embodiment 1.

Following the state illustrated in FIG. 7, FIG. 8 illustrates the case where the user moves the operating body 11 and selects an object.

FIG. 8 represents a diagram exemplifying a GUI, following the state exemplified in FIG. 7. The example illustrates that the user has selected (immediately after selection) one of the objects displayed on the screen, using the motion of the operating body 11. In other words, the user performs an operation for selection by watching the screen and moving the positions of the pointing finger, the middle finger, the ring finger, and the little finger in order to make the gradient of the line segment of the first symbol 107 larger than the gradient of the line segment of the second symbol 109. It is noted that when the operating body 11 is moved and the control amount conforms to the threshold, the line segment of the first symbol 107 conforms to the line segment of the second symbol 109 in gradient. Based on the positions 102 of the pointing finger, the middle finger, the ring finger, and the little finger of the operating body 11, the screen displays the pointer 103 presented at a 2D position obtained through predetermined projection transformation performed on the average position calculated. Moreover, in order to indicate a control amount, the screen displays the first symbol 107. Here the control amount is a gradient of a line segment with respect to the line segment's horizontal direction (the gradient is grater than that of FIG. 7), and the line segment (i) passes through the average position of the positions 102 of the pointing finger, the middle finger, the ring finger, and the little finger, and (ii) is obtained through predetermined projection transformation performed on a regression line 105 passing closest to the positions 102. The first symbol 107 is the line segment. Moreover, the screen displays the second symbol 109 which is a line segment that (i) passes through a position obtained through predetermined projection transformation performed on the average position, and (ii) indicates a threshold with the gradient thereof. Following the screen illustrated in FIG. 7, the screen in FIG. 8 illustrates how the gradient of the first symbol 107 (the line segment indicated in a bold line in FIG. 8) from its horizontal position is changed to be larger than the gradient of the second symbol 109 (the line segment indicated in a broken line in FIG. 8) from its horizontal position. Here the second symbol 109 works as an aid for operating the operating body 11. When such operations are performed, for example, the control unit 60 recognizes that the user has performed a predetermined action (selection, in this example). Then, as represented in FIG. 8, the object displayed at the display position of the pointer 103 is selected (the object is highlighted).

Hence, in the information input system 10 according to Embodiment 1, the user moves each of the parts of the operating body 11 while checking the second symbols 108 and 109 displayed as an operation aid on the screen of the display apparatus 16 (the display unit 52). Consequently, the user can change the first symbols 106 and 107, perform a predetermined action such as selection, and cause the information input system 10 to execute a predetermined function corresponding to the predetermined action. Such features allow the user to easily perform the pointing operation and the selecting operation on an object displayed on the screen, without a special operating device.

[Embodiment 2]

Described hereinafter is an information input system 10a according to Embodiment 2, with reference to FIGS. 9 to 12. The hardware structure of the information input system 10d is the same as that illustrated in FIG. 2. It is noted that detailed descriptions shall be omitted for the same structure and processing as those in Embodiment 1.

Figure 9:
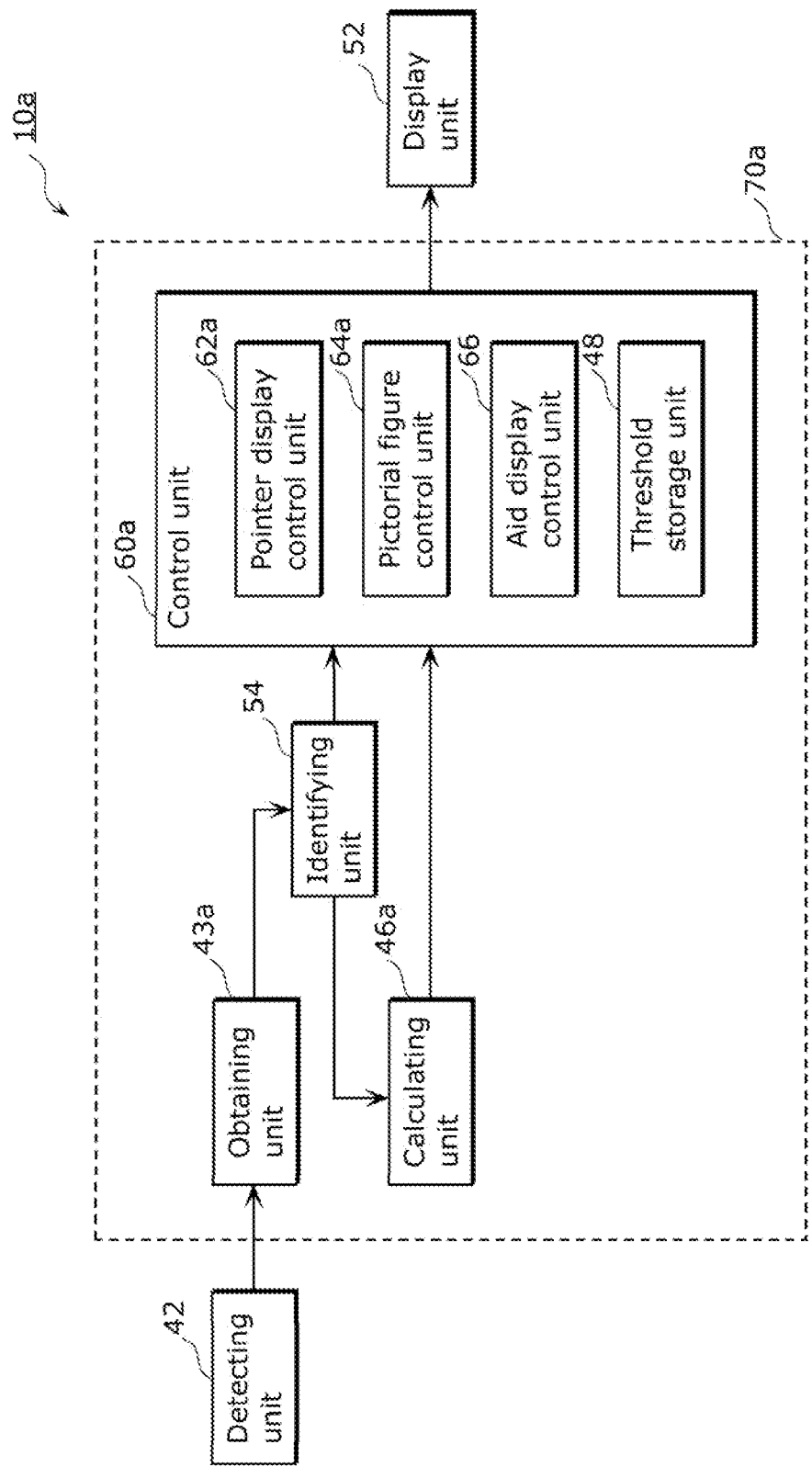
FIG. 9 represents a functional block diagram of an information input system according to Embodiment 2.

FIG. 9 represents a functional block diagram of the information input system 10a.

Functionally, the information input system 10a is for an apparatus to obtain a user operation directed to an image displayed on the display unit 52. The information input system 10a includes the detecting unit 42, an information processing unit 70a, and the display unit 52. Here the information processing unit 70a is a processing system to perform screen display control and the like, using the 3D position. The information processing unit 70a is implemented by the control apparatus 20 and includes an obtaining unit 43a, an identifying unit 54, a calculating unit 46a, and a control unit 60a. The obtaining unit 43a, the calculating unit 46a, and the control unit 60a in this information processing unit 70a are partially modified versions of the obtaining unit 43, the calculating unit 46, and the control unit 60 in the information processing unit 70 according to Embodiment 1, and the overlapping details therebetween shall be omitted.

The obtaining unit 4 a is capable of obtaining the 3D position, of the operating body 11, detected by the detecting unit 42, and providing the obtained 30 position to the identifying unit 54. In other words, the obtaining unit 43a acts as an input interface included in the information processing unit 70a and used for inputting the 3D position.

The identifying unit 54 is capable of identifying one of the parts of the operating body 11 as a pointer control part, and providing the calculating unit 46a and the control unit 60a with information indicating the pointer control part in addition to the parts. Here the pointer control part indicates a part which corresponds to the position of the pointer to be displayed on the display unit 52. Specifically, for example, the identifying unit 54 identifies, as the pointer control part, the physically closest part to the display unit 52 from among the parts, of the operating body in the 3D space, whose positions are detected by the detecting unit 42. It is noted that, as the pointer control part, the identifying unit 54 may identify (i) a part whose position has been detected, from the detected positions of the part of the operating body 11, since the least recent time in a chronological order. Moreover, the identifying unit 54 may identify and (ii) a specific finger such as the thumb.

The calculating unit 46a can calculate a control amount (i) based on a position of at least one part (i-a) included in the positions, of the parts of the operating body 11, provided to the identifying unit 54 and found in the 3D space, and (i-b) other than the position of the pointer control part (remaining position), and (ii) with reference to the position of the pointer control part. The calculating unit 46a can transmit the control amount to the control unit 60a. Here the control amount changes when the user performs an operation to move the operating body 11 to indicate his or her intension such as selection, enlargement, and reduction. The control amount reflects the position of the at least one part (i) found with reference to the position of the pointer control part of the operating body 11 and (ii) other than the pointer control part. For example, setting, as the reference (center), the pointer control part (the thumb, for example) of the operating body 11 in the 3D space, the calculating unit 46*a* calculates the smallest sphere including a part (the pointing finger, for example) in the 3D space other then the pointer control part. Then the calculating unit 46*a* calculates the radius of the sphere as the control amount. If the control amount satisfies a predetermined condition, in other words if the relationship between the control amount and a predetermined threshold satisfies a predetermined condition (such as a predetermined equivalence relationship and a predetermined magnitude relationship), the control unit 60*a* recognizes the operations such as selection, enlargement, and reduction.

The control unit 60*a* is capable of executing control for updating screen display and predetermined processing related to an object based on (i) the 3D position, of the pointer control part of the operating body 11, provided from the identifying unit 54, (ii) a 3D position of at least one remaining part, and (iii) the control amount calculated by the calculating unit 46*a*, As the update of the screen display, the control unit 60*a* executes control for (i) displaying a pointer (position symbol) at a position found on the screen and determined based on the current 3D position of the pointer control part of the operating body 11 and (ii) displaying a control symbol (pictorial figure) for indicating a control amount determined in relation to the operating body 11. In addition, the control unit 60*a* determines whether or not an operation such as selection, enlargement, and reduction is performed based on whether or not the control amount satisfies a predetermined condition. If the operation, such as selection, enlargement, and reduction, is performed, the control unit 60*a* executes processing related to the object displayed at the position where the pointer is displayed.

As functional constituent elements, the control unit 60*a* includes a pointer display control unit 62*a*, a pictorial figure display control unit 64*a*, the aid display control unit 66, and the threshold storage unit 48.

The pointer display control unit 62*a* is capable of executing control for determining a position on the screen of the display unit 52 in association with the position of the pointer control part determined by the identifying unit 54, and displaying a pointer at the determined position. For example, the pointer display control unit 62 calculates, as a display position, a 2D position obtained through predetermined projection transformation performed on the 3D position of the pointer control part in the 3D space. It is noted that the predetermined projection transformation is to convert into, for example, a 2D coordinate plane used for display and parallel to the screen of the display unit 52.

The pictorial figure display control unit 64*a* is capable of executing control for displaying a first symbol (a part of a control symbol) on a screen of the display unit 52. Here the first symbol is a pictorial figure whose size reflects the degree of the control amount calculated by the calculating unit 46*a*. For example, when the calculating unit 46*a* calculates (i) the smallest sphere having, as the center, the 3D position of the pointer control part of the operating body 11 and including a part other than the pointer control part, and (ii) the radius of the sphere as the control amount, the first symbol is a circle obtained through predetermined projection transformation performed on the sphere having the radius.

The threshold storage unit 48 is implemented in a form of an area of the RAM 26 or the recording medium 28, and is capable of storing a threshold as a reference to be used to determine whether or not the control amount satisfies the predetermined condition. The threshold is set by a manufacturer, an administrator, or a user of the information input system 10*a* within the range where the control amount may change. In the case where the control amount is calculated as the radius of the smallest sphere having the thumb as the center and including the position of the pointing finger, the control amount is expected to change within the range whose upper limit is, for example, approximately 15 cm. Here exemplary thresholds for enlargement processing and reduction processing are respectively 8 cm and 4 cm.

The aid display control unit 66 is capable of executing control for displaying a second symbol (a part of the control symbol) on the screen of the display unit 52. Here the second symbol is a pictorial figure whose size reflects the degree of the threshold stored in the threshold storage unit 48. For example, the second symbol is a circle obtained by performing predetermined projection transformation on a sphere whose radius is the threshold. For example, the second symbol is a circle which is concentrically arranged with another circle acting as the first symbol. The ratio of the threshold to the control amount conforms to that of the radius of the circle acting as the second symbol to the radium of the other circle acting as the first symbol. It is noted that if there are two or more thresholds, the second symbol includes multiple concentric circles.

In other words, the control unit 60*a* executes control to display, on the screen of the display unit 52, (i) a pictorial figure (the first symbol) including a circle, a line segment, and a polygon, and having the control amount reflected in the size or the orientation (gradient) thereof, and (ii) a pictorial figure (the second symbol) including a circle, a line segment, and a polygon (a triangle and a square), and having a threshold of the control amount reflected in the size or the orientation (gradient) thereof. Here the control amount is a criterion for determination. The control unit 60*a* compares a threshold with the control amount calculated by the calculating unit 46*a*, and determines whether or not the control amount satisfies a predetermined condition. If the control amount conforms to the threshold, the first symbol and the second symbol to be displayed on the screen are to conform to each other in size and orientation.

Exemplified hereinafter is how to calculate a control amount, using as the reference, and the position of the pointer control part of the operating body 11, based on a position of at least one remaining part. Here calculated control amount is other than the above-described radius of the sphere.

For example, the calculating unit 46*a* may calculate a regression line, and calculate, as a control amount, the gradient of a line segment obtained through predetermined projection transformation performed on the regression line. Here the regression line is calculated by techniques such as the least-square technique, and passes through the 3D position of the pointer control part (the thumb, for example) of the operating body 11, and passes closest to a 3D position of a remaining part of the operating body 11 (four of the fingers other than the thumb, for example). The predetermined projection transformation is to convert into, for example, a 2D coordinate plane used for display and parallel to the screen of the display unit 52. When the line segment obtained through the projection transformation is drawn on the screen, the gradient of the line segment as the control amount is represented by an angle between the line segment and, for example, the horizontal direction of the screen. Here the pictorial figure display control unit 64*a* may cause, for the regression line, a line segment (a line segment in accordance with the control amount) to be displayed on the screen of the display unit 52 as the first symbol. Here the line segment is obtained as a result of the projection transformation for the 2D coordinate plane used for display. Furthermore, the aid display control unit 66 may cause a line segment to be displayed on the screen of the display unit 52 as the second symbol. Here the line segment as the second symbol passes through the line segment in accordance with the control amount, and the gradient of the line segment as the second symbol to the horizontal direction coincides with the threshold (here the value of the gradient) stored in the threshold storage unit 48.

Described next is an operation of the above-structured information input system 10a. The description is made on the assumption in the case where the user moves an operating body and performs a predetermined action, such as enlargement and reduction, on any given object when the screen includes multiple objects.

Figure 10:
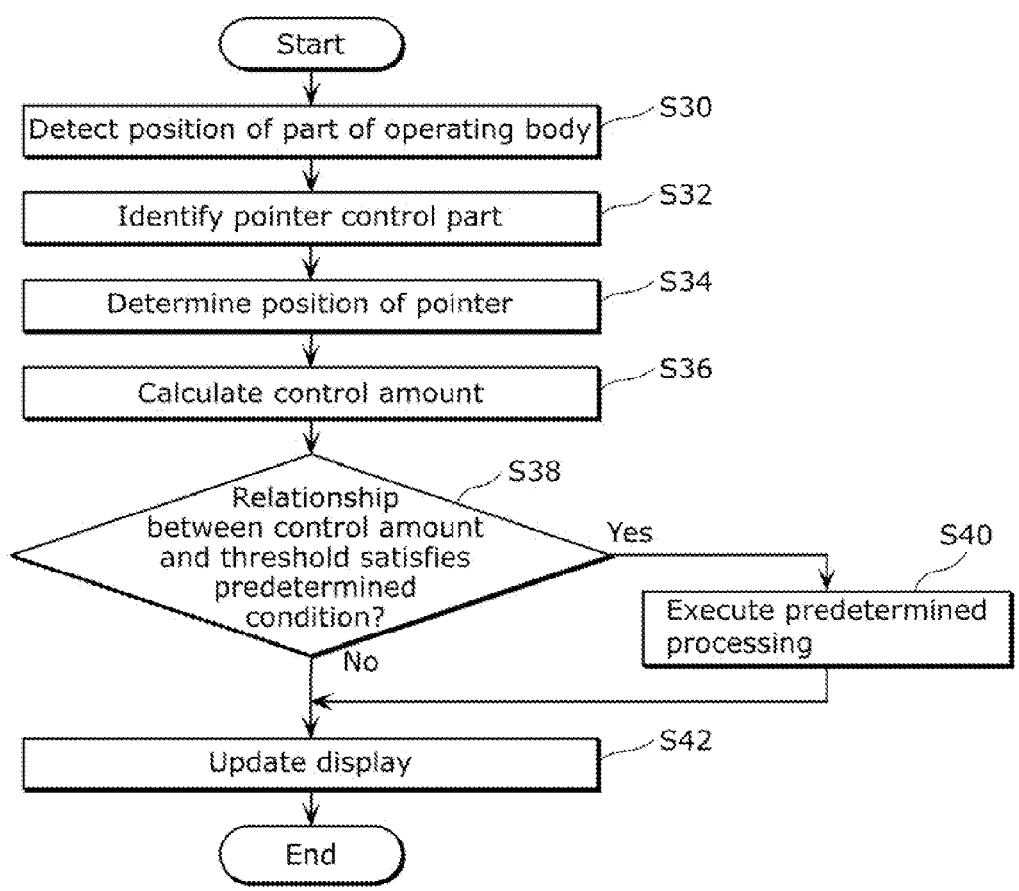
FIG. 10 represents a flowchart of an operation of the information input system according to Embodiment 2.

FIG. 10 represents a flowchart of an operation of the information input system 10a.

First, the detecting unit 42 detects at least two of the parts of the operating body 11 in the 3D space (Processing Step S30). Assumed here is the case where the operating body 11 is one hand, and the detecting unit 42 is previously set to determine the 3D positions of the five fingers (at least two of the fingers that are the thumb and the pointing finger). 3D positions of the fingers detected by the detecting unit 42 are obtained by the obtaining unit 43a, and transmitted to the identifying unit 54.

When the positions of the parts of the operating body 11 detected by the detecting unit 42 are transmitted by the obtaining unit 43a, the identifying unit 54 identifies, as a pointer control part, one of the parts which corresponds to the position of a pointer to be displayed on the screen of the display unit 52 (Processing Step S32). For example, the thumb is identified as the pointer control part. Then the position of the pointer control part is separated from the positions of the remaining parts and transmitted to the control unit 60a and the remaining parts are transmitted to the calculating unit 46a.

The pointer display control unit 62a included in the control unit 60a, which has received the position of the pointer control part, determines the position on the screen to display the pointer, based on the position of the pointer control part (Processing Step S34). Specifically, for example, if the thumb is identified as the pointer control part, the pointer display control unit 62a calculates a 2D position obtained through predetermined projection transformation performed on the position of the thumb, and determines the 2D position as a display position of the pointer on the screen. Hence, in the proceeding Processing Step S42, the pointer is to be displayed at the determined display position on the screen of the display apparatus 16 (the display unit 52).

In addition, receiving the 3D positions, the calculating unit 46a calculates, with reference to the position of the pointer control part, a control amount based on a position of at least one of the parts other than the pointer control part (Processing Step S36). As a specific example, the calculating unit 46a calculates the smallest sphere (i) having, as the center, the position of the thumb identified as the pointer control part and (ii) including the 3D position of the pointing finger. Then the calculating unit 46a calculates the radius of the sphere as the control amount.

When the calculating unit 46a calculates the control amount, the control unit 60a determines whether or not the calculated control amount satisfies a predetermined condition—that is whether or not the relationship between the control amount and a predetermined threshold satisfies the predetermined condition (Processing Step 38).

If determining that the control amount satisfies the predetermined condition, the control unit 60a executes a predetermined function (Processing Step S40). The predetermined function is, for example, to execute predetermined processing in relation to an object displayed at the display position of the pointer on the screen of the display apparatus 16. A specific example of the predetermined function is such as enlarging or reducing the size of an object, and setting the object to the selection state. For example, the control unit 60a may execute the enlargement function when the control amount changes from a value smaller than a threshold to a value larger than the threshold, and may execute the reduction function when the control amount changes from a value larger than another threshold to a value smaller than the other threshold.

Then the control unit 60a executes control for updating a displayed detail on the screen of the display apparatus 16 (Processing Step S42). Specifically, the pointer display control unit 62a in the control unit 60a forms a display image for displaying the pointer (position symbol) at the position found on the screen and determined in the Processing Step S34. Furthermore, for example, the pictorial figure display control unit 64a forms a display image for displaying, on the screen, the first symbol including a circle obtained through predetermined projection transformation (the same projection transformation performed in the Processing Step S34) performed on the sphere having, as the radius, the control amount determined by the calculating unit 46a. Moreover, for example, the aid display control unit 66 forms a display image for displaying on the screen the second symbol including a circle obtained through the same predetermined projection transformation performed on a sphere (i) whose center point is the same as that of the sphere having, as the radius, the control amount to be the basis of the first symbol and (ii) whose radius is a threshold. Thus the circle of the first symbol is concentrically arranged with the circle of the second symbol. Then, based on the display images formed by each of the units, the control unit 60a provides the display apparatus 16 with an image signal formed for displaying, on the screen of the display apparatus 16, the control symbol including the first symbol and the second symbol and the pointer.

The Processing Steps S30 to S42 are sequentially repeated. Hence the detecting unit 42 sequentially detects the positions of the parts of the operating body 11, the obtaining unit 43a sequentially obtains the detected positions and transmits the positions to the control unit 60a via the identifying unit 54, and the control unit 60a sequentially updates the display details on the screen of the display apparatus 16. Thus, in addition to multiple objects, the screen of the display apparatus 16 displays a control symbol and a pointer which change in response to the motion of the operating body 11 moved by the user.

Figure 11:
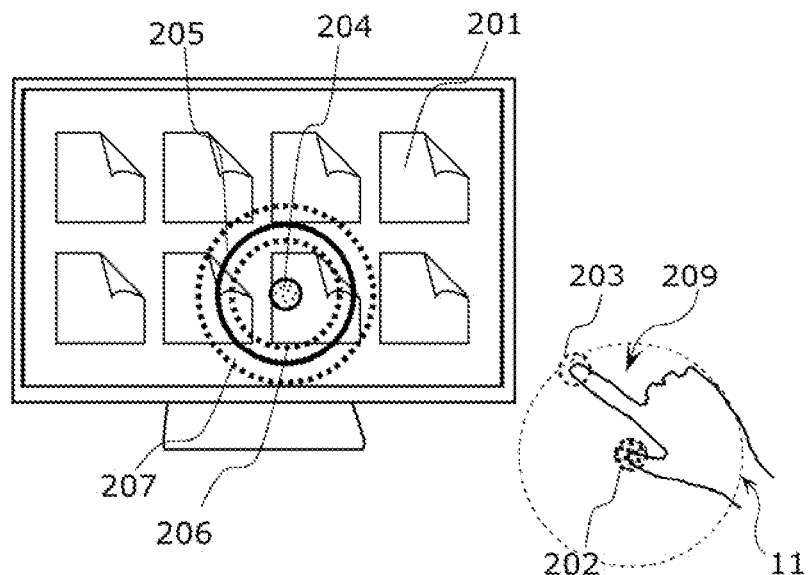
FIG. 11 represents a diagram exemplifying an operation and a screen of the information input system according to Embodiment 2.

FIG. 11 represents an exemplary GUI provided by the information input system 10a. In the example, multiple objects 201 are arranged and displayed on the screen of the display apparatus 16 (display unit 52).

This example illustrates that the thumb is identified as the pointer control part, and the user is about to enlarge or reduce (before enlargement and reduction) one of the objects displayed on the screen, using the motion of the operating body 11. In other words, the screen displays a pointer 204 to be displayed at a 2D position obtained through predetermined projection transformation performed on a position 202 of the thumb of the operating body 11. Furthermore, in order to indicate a control amount, the screen displays a first symbol 205. Here the control amount is the radius of a sphere 209 which is the smallest sphere (i) having, as the reference (center), the position 202 of the thumb that is the pointer control part of the operating body 11, and (ii) including the position of the pointing finger. The first symbol 205 is a circle obtained through predetermined projection transformation performed on the sphere 209. In addition, the screen displays second symbols 206 and 207 as circles obtained through the same predetermined projection transformation performed on the sphere 209 observed on the assumption that the radius of the sphere 209 conforms to the threshold.

Figure 12:
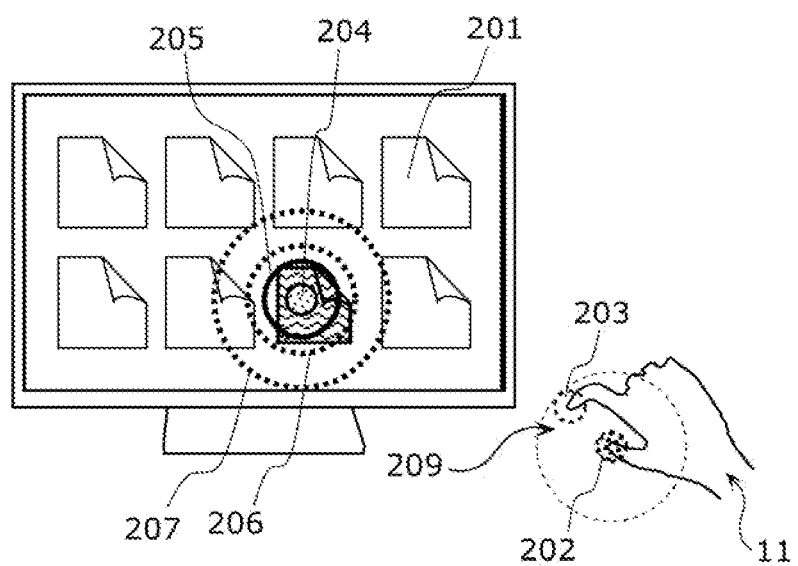
FIG. 12 represents a diagram exemplifying changes from FIG. 11 in the operation and the screen of the information input system according to Embodiment 2.

Following the state illustrated in FIG. 11, FIG. 12 illustrates the case where the user moves the operating body 11 and reduces an object.

FIG. 12 represents a diagram exemplifying a GUI, following the state exemplified in FIG. 11. The example illustrates that the user has reduced one of the objects displayed on the screen, using the motion of the operating body 11. The user narrows the distance between the positions 102 of the pointing finger and the thumb. The screen displays the pointer 204 displayed at the 2D position obtained through predetermined projection transformation performed on the position 202 of the thumb of the operating body 11. Furthermore, in order to represent a control amount which is the radius of the smallest sphere 209 (a sphere smaller than the exemplary one in FIG. 11) having the position of the thumb as the center and including the position of the pointing finger, the first symbol 205 is displayed as a circle (a circle smaller than the one in FIG. 11) obtained through predetermined projection transformation performed on the sphere 209. Moreover, the second symbol 206 is displayed as a circle obtained through the same predetermined projection transformation performed on the sphere 209 observed on the assumption that the radius of the sphere 209 conforms to a threshold for reduction. In addition, the second symbol 207 is displayed as a circle obtained through the same predetermined projection transformation performed on the sphere 209 observed on the assumption that the radius of the sphere 209 conforms to a threshold for enlargement. Following the screen illustrated in. FIG. 11, the screen in FIG. 12 illustrates that the size of the first symbol 205 (a heavy-line circle in FIG. 11) has changed smaller than the size of the second symbol 206 (a broken-line circle in FIG. 12) working as an aid for an operation of the operating body 11. When such operations are performed, for example, the control unit 60a recognizes that the user has performed a predetermined action (reduction operation, in this example). Then, as represented in FIG. 12, the object displayed at the display position of the pointer 204 is reduced. Even though not shown in FIG. 12, moreover, when the user performs an operation so that the size of the first symbol 205 becomes larger than that of the second symbol 207, the control unit 60a recognizes that the user has performed an enlargement operation, and the object displayed at the display position of the pointer 204 is enlarged. It is noted that described here is how to execute the enlargement and reduction functions. Other than the enlargement and reduction, various functions such as selection and determination can be executed, using similar techniques as those described above.

Hence, in the information input system 10a, the user moves a different part from a finger (the pointer control part) for operating the pointer displayed on the screen of the display unit 52. Consequently, the user can perform an action such as enlargement and reduction and cause the information input system 10a to execute a predetermined function corresponding the action. Such features allow the user to easily perform the pointing operation as well as operations, such as enlargement, reduction and selection, on an object displayed on the screen without a special operating device.

[Embodiment 3]

Described hereinafter is an information input system 10b according to Embodiment 3 with reference to FIG. 13. The hardware structure of the information input system 10b is the same as that illustrated in FIG. 2. It is noted that detailed descriptions shall be omitted for the same structure and processing as those in Embodiment 1.

Figure 13:
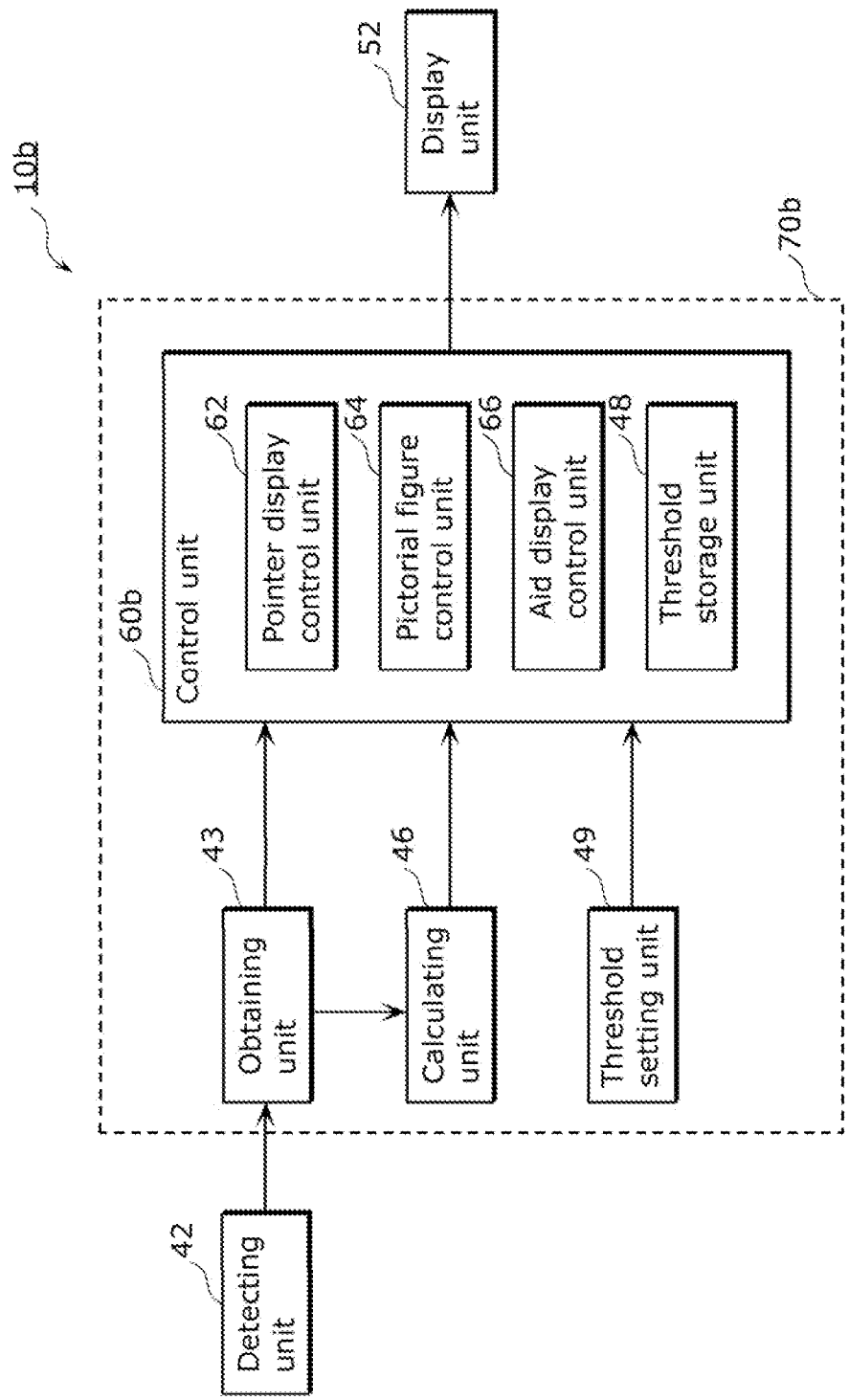
FIG. 13 represents a functional block diagram of an information input system according to Embodiment 3.

FIG. 13 represents a functional block diagram of the information input system 10b.

The information input system 10b is for an apparatus to obtain a user operation directed to an image displayed on the display unit 52. The information input system 10b functionally includes the detecting unit 42, an information processing unit 70b, and the display unit 52. Here the information processing unit 70b is a processing system to perform screen display control and the like, using the 3D position. The information processing unit 70b is implemented by the control apparatus 20 and includes the obtaining unit 43, the calculating unit 46, a threshold setting unit 49, and a control unit 60b. The control unit 60b in the information processing unit 70b is a partially modified version of the control unit 60 in the information processing unit 70 according to Embodiment 1, and the overlapping details therebetween shall be omitted. In addition to the capabilities of the information input system 10 according to Embodiment 1, the information input system 10b is further capable of setting a threshold in accordance with information inputted by the user via an input unit (not shown) such as a keyboard. In order to implement the capability, the information input system 10b functionally includes the threshold setting unit 49.

The threshold setting unit 49 is capable of receiving the input of the information (the information on the size of the user's hand) on the operating body 11 from the user via the input unit, and, based on the information, determining a threshold so that a control amount can be changed within a range of the threshold.

Described here is how to calculate a threshold on the assumption that the control amount is the radius of a sphere including the fingers of one hand as described in FIGS. 5 and 6 according to Embodiment 1. Here, based on the previously-determined standard size of a hand (18 cm, for example) and on the previously-determined standard threshold of 6 cm (the range of change in control amount is between 4 cm and 10 cm), a threshold is calculated by receiving the input of information on the size of a hand, such as for example the maximum distance between the thumb and the little finger. When an input value of the hand size is 12 cm—that is, two thirds of the standard size—, for example, a threshold is determined to be 4 cm—that is, two third of the standard threshold—. It is noted that, other than being obtained by calculation, the threshold may also be calculated based on a previously created table (a corresponding table between hand sizes and thresholds). Moreover, in addition to the user directly inputting his or her hand size, the user may also input his or her sex so that the threshold setting unit 49 may calculate a threshold using a calculation technique in accordance with an average difference between the sizes of man and woman. In this case, when the inputted sex is woman, the threshold setting unit 49 sets a threshold by, for example, 1 cm smaller than the standard threshold, and calculates the threshold. When the inputted sex is man, the threshold setting unit 49 setting unit sets a threshold by, for example, 1 cm larger than the standard threshold, and calculates the threshold.

The threshold storage unit 4 in the control unit 60b stores the threshold calculated by the threshold setting unit 49 as the reference to be used to determine whether or not the control amount satisfies a predetermined condition.

Based on the threshold stored in the threshold storage unit 48, the information input system 10b structured above executes a predetermined function if a control amount which is to be determined in accordance with the position of the operating body 11 satisfies a predetermined condition, so does the information input system 10 described in Embodiment 1.

Hence, in the information input system 10b, the user previously inputs information on the operating body 11. This allows the user to easily perform an operation, such as enlargement, reduction, and selection, directed to an object displayed on the screen.

[Modification etc.]

Described above are information input systems implemented in a form of an information processing apparatus and an information processing method, based on Embodiments 1 to 3. Each of the embodiments is, however, simply an example. Hence the present invention shall not be limited to such embodiments. Various modifications conceived by the persons skilled in the art may be added to the embodiments unless otherwise departing from the scope of the present invention. Other than the above, any given combination of the constituent elements and functions described in each of the embodiments may be included within a scope of the present invention.

In the above embodiments such as Embodiment 1, the control apparatus 20 analyzes an image obtained by the stereo camera 12 and calculates the 3D position of the operating body 11; however, a sensor may be used to detect 3D positions of two or more parts of the operating body 11 and transmit information on the detected positions to the control apparatus 20.

Furthermore, instead of the stereo camera 12, the detecting unit 42 may be implemented with a use of a unit (one camera, for example) to detect a 3D position in the form of 2D position information. In this case, the obtaining unit 43 obtains a 2D position (a position represented as a coordinate value Q (x,y) with reference to two perpendicular axes (an X-axis and a Y-axis) in the 2D plane) of each of the parts of the operating body 11. Here, in this case, the calculating unit 46 calculates a control amount in accordance with at least two of the obtained 2D positions of the parts of the operating body 11, and transmits the calculated control amount to the control unit 60. In calculating the control amount, for example, one camera captures multiple parts, of the operating body 11 in a 3D space, from a certain direction on the screen side of the display apparatus 16, and obtains a 2D position for each of the parts. Then the smallest circle that obtains each 2D position is calculated, and the radius of the circle is calculated as the control amount. If the control amount satisfies a predetermined condition, in other words if the relationship between the control amount and a predetermined threshold satisfies a predetermined condition (such as a predetermined equivalence relationship and a predetermined magnitude relationship), the control unit 60 recognizes the operation as selection and the like. Based on the 3D positions of the parts of the operating body 11, the pointer display control unit 62 executes control for determining a position on the screen of the display unit 52 and displaying a pointer (position symbol) at the determined position. In addition, the pictorial figure display control unit 64 executes control for displaying a first symbol (a circle whose radius is a control amount) on a screen of the display unit 52. Here the first symbol is a pictorial figure whose size reflects the degree of the control amount calculated by the calculating unit 46. In addition, the aid display control unit 66 executes control for displaying a second symbol (a circle whose radius is a threshold and which is concentrically arranged with the circle of the first symbol) on the screen of the display unit 52. Here the second symbol is a pictorial figure whose size reflects the degree of the threshold stored in the threshold storage unit 48. Such control allows the user to move the operating body 11 on the screen while understanding, on the screen, the relationship of the first symbol to the second symbol in order to perform a function such as selection.

It is noted that the first symbol, which reflects the degree of the control amount in the size of a pictorial figure, and the second symbol, which reflects the degree of the threshold in the size of a pictorial figure, do not necessarily homologous to each other. The degrees of the control amount and the threshold may be reflected in a size (value), such as the length, area, and angle, of each symbol (pictorial figure). The length of a pictorial figure may be, for example, that of a specific part such as the longest side. The angle of a pictorial figure may be, for example, an angle between a side of the pictorial figure and a specific direction (such as the horizontal direction). For colors of a pictorial figure, for example, a certain order may be determined for values of the colors, and the number of the value of a color may be regarded as the size of the pictorial figure. Then the degrees of the control amount and the threshold may reflect on the color of the pictorial figure.

In the embodiments such as Embodiment 1, the screen of the display apparatus 16 displays a control symbol and a pointer (position symbol) in accordance with a position of at least one part of the operating body 11; however, the screen does not have to display the pointer in particular. Instead, the control symbol may work as the pointer (the control symbol implements the function of pointing, using the display position thereof). For example, a specific part, such as the center of a pictorial figure which is the control symbol, may indicate a pointed position. For this, a control unit may cause the specific part to be displayed at the position determined in the Processing Steps in S12 in FIG. 4 and in S34 in FIG. 10. Furthermore, in displaying the pointer (position symbol) separately from the control symbol, the display position of the control symbol may be near the pointer, such as a position within a predetermined distance range from the pointer, or may be a fixed position on the screen.

Moreover, in Embodiments 1 to 3, each of the constituent elements may be implemented in a form of dedicated hardware. The constituent elements may also be implemented through execution of software (program) suitable to each constituent element. Each of the constituent elements may be implemented as a program executing unit, such as a CPU and a processor, which reads out and executes a software program recorded on a recording medium including a hard disk or a semiconductor memory.

The software that implements an information input system according to Embodiments 1 to 3 is control program as described below.

The control program is to cause an information processing apparatus, including a processor, to execute information processing for executing predetermined processing in relation to an object displayed on a screen. The information processing executed on the control program includes: obtaining position information indicating positions detected for two or more parts of an operating body; calculating a control amount on a basis of the positions of the two or more parts, the positions being indicated in the position information; and controlling including (i) displaying, on the screen, a control symbol including (i-a) a first symbol which represents the control amount calculated in the calculating and (i-b) a second symbol which represents a threshold to be a criterion for determining whether or not the control amount satisfies a predetermined condition, and (ii) executing the predetermined processing in a case where the control amount is determined to satisfy the predetermined condition.

In addition, the above control program may be recorded on a recording medium and distributed. For example, the distributed control program may be installed on a device etc., and executed by a processor of the device etc. Hence the device etc., can execute various processing (processing etc. indicated in FIGS. 4 and 10).

A part or all of the constituent elements constituting the respective apparatuses may be configured from a single System-LSI (Large-Scale Integration). The System-LSI is a super-multi-function LSI manufactured by integrating constituent units on one chip. Specifically, the System-LSI is a computer system including a microprocessor, a ROM, a RAM, or by means of a similar device. The ROM stores a computer program. The System-LSI achieves its functions when the microprocessor loads the computer program from the ROM to the RAM, and executes an operation such as calculation in accordance with the loaded computer program.

A part or all of the constituent elements constituting each of the apparatuses may be configured as an IC card which can be attached to and detached from each apparatus or as a stand-alone module. The IC card or the module is a computer system configured from a microprocessor, a ROM, and a RAM. The IC card or the module may also be included in the aforementioned super-multi-function LSI. The IC card or the module achieves its functions through the microprocessor's operation according to the computer program. The IC card or the module may also be implemented to be tamper-resistant.

Furthermore, the present invention may also be implemented in the form of the computer program or the digital signal stored in a computer readable recording medium such as a flexible disc, a hard disc, a CD-ROM, an MO, a DVD, a DVD-ROM, a DVD-RAM, a BD (Blu-ray (Registered) Disc), and semiconductor memory. In addition, the present invention may also be the digital signal recorded on these recording media.

Moreover, the aforementioned computer program or digital signal according to the present invention may also be transmitted via a telecommunication line, a wireless or wired communication line, a network represented by the Internet, and data broadcast.

Moreover, the present invention may be implemented by the above program or the above digital signal recorded on the above recording media for their transportation or transmitted via the above network in order to be executed on another independent computer system.

In addition, in the embodiments, each processing (each function) may be implemented by integrated processing on a single apparatus (system) or by decentralized processing on multiple apparatuses.

INDUSTRIAL APPLICABILITY

The present invention can be used for an information input system and the like which provides GUI.

REFERENCE SIGNS LIST 10, 10a, 10b Information input system
11 Operating body
12 Stereo camera
14 Communications apparatus
16 Display apparatus
18 Input apparatus
20 Control apparatus
22 CPU
24 ROM
26 RAM
28 Recording medium
42 Detecting unit
43, 43a Obtaining unit
46, 46a Calculating unit
48 Threshold storage unit
49 Threshold setting unit
52 Display unit
54 Identifying unit
60, 60a, 60b Control unit
62, 62a Pointer display control unit
64, 64a Pictorial figure control unit
66 Aid display control unit
70, 70a, 70b Information processing unit

The invention claimed is:

1. An information processing method to be performed by an information processing apparatus, for executing predetermined processing in relation to an object displayed on a screen, the information processing method comprising:
   obtaining position information indicating positions detected for two or more parts of an operating body;
   calculating a control amount on a basis of the positions of the two or more parts, the positions being indicated in the position information; and
   controlling including (i) displaying, on the screen, a control symbol including (i-a) a first symbol which represents the control amount calculated in the calculating and (i-b) a second symbol which represents a threshold to be a criterion for determining whether or not the control amount satisfies a predetermined condition, and (ii) executing the predetermined processing in a case where the control amount is determined to satisfy the predetermined condition;
   wherein the position information indicates a 3D position, the information processing method further comprising detecting 3D positions of the two or more parts of the operating body, causing generating the position information, the obtaining includes obtaining the position information generated in the detecting, and the controlling includes (i) displaying the control symbol at a 2D position found on the screen and obtained through predetermined projection transformation performed on one 3D position determined on a basis of the position information, and (ii) executing the predetermined processing in relation to an object displayed at a display position of the control symbol in a case where the control amount is determined to satisfy the predetermined condition.

2. The information processing method according to claim 1,
   wherein the controlling further includes displaying a position symbol at a position, on the screen, determined in accordance with one or more of the positions indicated in the position information, and
   in the controlling, the predetermined processing is executed in relation to an object displayed at a display position of the position symbol.

3. The information processing method according to claim 2,
   wherein the position information indicates a three-dimensional (3D) position,
   the information processing method further comprising detecting 3D positions of the two or more parts of the operating body, causing sequentially generating the position information,
   in the obtaining, the position information generated in the detecting is sequentially obtained,
   in the controlling, the position symbol and the control symbol are sequentially displayed on the screen in response to the sequentially obtaining the position information in the obtaining, and in the controlling, the position at which the position symbol is to be displayed on the screen is a two-dimensional (2D) position obtained through predetermined projection transformation performed on one 3D position determined on a basis of the position information.

4. The information processing method according to claim 3,
wherein the second symbol includes a pictorial figure indicating the threshold and formed in a predetermined size, and
the first symbol includes a pictorial figure which is homologous to the pictorial figure included in the second symbol and formed in the predetermined size, the pictorial figure in the first symbol reflecting the control amount in a size of the pictorial figure in the first symbol.

5. The information processing method according to claim 4,
wherein the pictorial figure included in the second symbol and formed in the predetermined size is a circle used for indicating the threshold and formed in a predetermined size, and
the first symbol includes a circle obtained through predetermined projection transformation performed on a smallest sphere including the positions used as the basis for the calculation of the control amount, the circle in the first symbol being concentrically arranged with the circle in the second symbol.

6. The information processing method according to claim 5, further comprising
identifying one of the two or more parts of the operating body,
wherein the display position of the position symbol on the screen is a 2D position obtained through the predetermined projection transformation performed on a 3D position indicated in the position information on the one part identified in the identifying,
the smallest sphere has, as a center, a position of the one part identified in the identifying, and
in the calculating, the control amount is calculated (i) with reference to the position of the one part identified in the identifying and (ii) in accordance with an other position of at least one of the two or more parts of the operating body that is different from the one part identified in the identifying.

7. The information processing method according to claim 3,
wherein the second symbol includes a line segment having a predetermined gradient for indicating the threshold, and
the first symbol includes a line segment reflecting the control amount in a gradient of the line segment, the line segment in the first symbol and the line segment in the second symbol passing through a same point.

8. The information processing method according to claim 7,
wherein the line segment in the first symbol is obtained through predetermined projection transformation performed on a regression line found closest to the positions used as the basis for the calculation of the control amount,
the information processing method further comprising identifying one of the two or more parts of the operating body,
in the controlling, the display position of the position symbol on the screen is a 2D position obtained through the predetermined projection transformation performed on a 3D position indicated in the position information on the one part identified in the identifying,
the regression line is a straight line passing through the 3D position indicated in the position information on the one part identified in the identifying, and
in the calculating, the control amount is calculated on a basis of an other position of at least one of the two or more parts of the operating body, the at least one part of the operating body being different from the one part identified in the identifying.

9. The information processing method according to claim 3, further comprising
identifying one of the two or more parts of the operating body,
wherein, in the controlling, the display position of the position symbol on the screen is a 2D position obtained through the predetermined projection transformation performed on a 3D position indicated in the position information on the one part identified in the identifying.

10. The information processing method according to claim 1,
wherein, in the controlling, the predetermined condition is determined to be satisfied in a case where the control amount and the threshold satisfy a predetermined relationship including an equivalence relationship or a magnitude relationship.

11. The information processing method according to claim 1,
wherein, in the controlling, the predetermined condition is determined to be satisfied in a case where the control amount changes, causing a change in magnitude relationship between the control amount and the threshold.

12. The information processing method according to claim 1,
wherein, in the controlling, the predetermined condition is determined to be satisfied only in one of cases where (i) the control amount changes from a value smaller than the threshold to a value larger than the threshold and (ii) the control amount changes from a value larger than the threshold to a value smaller than the threshold.

13. An information processing apparatus comprising:
an obtaining unit configured to obtain position information indicating positions detected for two or more parts of an operating body;
a calculating unit configured to calculate a control amount on a basis of the positions of the two or more parts, the positions being indicated in the position information; and
a control unit configured (i) to display, on the screen, a control symbol including (i-a) a first symbol which represents the control amount calculated in the calculating and (i-b) a second symbol which represents a threshold to be a criterion for determining whether or not the control amount satisfies a predetermined condition, and (ii) to execute the predetermined processing in a case where the control amount is determined to satisfy the predetermined condition;
wherein the position information indicates a 3D position, the information processing apparatus further comprising a detecting unit configured to detect 3D positions of the two or more parts of the operating body, to cause generating the position information, the obtaining includes obtaining the position information generated in the detecting, and the controlling includes (i) displaying the control symbol at a 2D position found on the screen and obtained through predetermined projection transformation performed on one 3D position determined on a basis of the position information, and (ii) executing the predetermined processing in relation to an object displayed at a display position of the control symbol in a case where the control amount is determined to satisfy the predetermined condition.

14. A non-transitory computer readable storage medium which stores a control program for causing an information processing apparatus, including a processor, to execute information processing for executing predetermined processing in relation to an object displayed on a screen,
the information processing including:
obtaining position information indicating positions detected for two or more parts of an operating body;
calculating a control amount on a basis of the positions of the two or more parts, the positions being indicated in the position information; and
controlling including (i) displaying, on the screen, a control symbol including (i-a) a first symbol which represents the control amount calculated in the calculating and (i-b) a second symbol which represents a threshold to be a criterion for determining whether or not the control amount satisfies a predetermined condition, and (ii) executing the predetermined processing in a case where the control amount is determined to satisfy the predetermined condition;
wherein the position information indicates a 3D position, the information processing method further comprising detecting 3D positions of the two or more parts of the operating body, causing generating the position information, the obtaining includes obtaining the position information generated in the detecting, and the controlling includes (i) displaying the control symbol at a 2D position found on the screen and obtained through predetermined projection transformation performed on one 3D position determined on a basis of the position information, and (ii) executing the predetermined processing in relation to an object displayed at a display position of the control symbol in a case where the control amount is determined to satisfy the predetermined condition.

* * * * *